US011675160B1

(12) United States Patent
England

(10) Patent No.: US 11,675,160 B1
(45) Date of Patent: Jun. 13, 2023

(54) MIRROR APPARATUS FOR CAMERA DEVICES

(71) Applicant: Amazon Technologies, Inc., Seattle, WA (US)

(72) Inventor: Matthew J. England, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 772 days.

(21) Appl. No.: 16/713,536

(22) Filed: Dec. 13, 2019

(51) Int. Cl.
*G02B 7/182* (2021.01)

(52) U.S. Cl.
CPC .................................. *G02B 7/182* (2013.01)

(58) Field of Classification Search
CPC ..................................................... G02B 7/182
USPC .......................................................... 359/871
See application file for complete search history.

(56) References Cited

U.S. PATENT DOCUMENTS

| | | | |
|---|---|---|---|
| 4,764,953 A | 8/1988 | Chern et al. | |
| 5,111,342 A * | 5/1992 | Quesada | B60D 1/36 359/872 |
| 5,428,388 A | 6/1995 | von Bauer et al. | |
| 5,760,848 A | 6/1998 | Cho | |
| 5,971,555 A * | 10/1999 | Wilcox | B60R 1/003 359/872 |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |

(Continued)

FOREIGN PATENT DOCUMENTS

| | | |
|---|---|---|
| CN | 2585521 | 11/2003 |
| CN | 2792061 | 6/2006 |

(Continued)

*Primary Examiner* — Euncha P Cherry
(74) *Attorney, Agent, or Firm* — Lee & Hayes, P.C.

(57) ABSTRACT

An apparatus that extends a field-of-view (FOV) of a camera of a camera device. For instance, the apparatus may include a frame and a visor. The frame may include a first side portion, a second side portion, a top portion, a bottom portion, and an opening for receiving a front of the camera device. The visor may include a first support that extends from the first side member, a second support that extends from the second side member, and a transverse member that extends between the first support and the second support. When the apparatus is attached to the camera device, the traverse member is located at least partly within the FOV of the camera. Additionally, the traverse member includes a mirror that reflects light from below and just in front of the camera device to the camera. This way, the FOV of the camera includes the area below and just in front of the camera device.

20 Claims, 24 Drawing Sheets

(56) References Cited

U.S. PATENT DOCUMENTS

| | | |
|---|---|---|
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0035987 A1 | 2/2015 | Fernandez |
| 2015/0163463 A1 | 6/2015 | Hwang et al. |
| 2018/0176512 A1 | 6/2018 | Siminoff |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

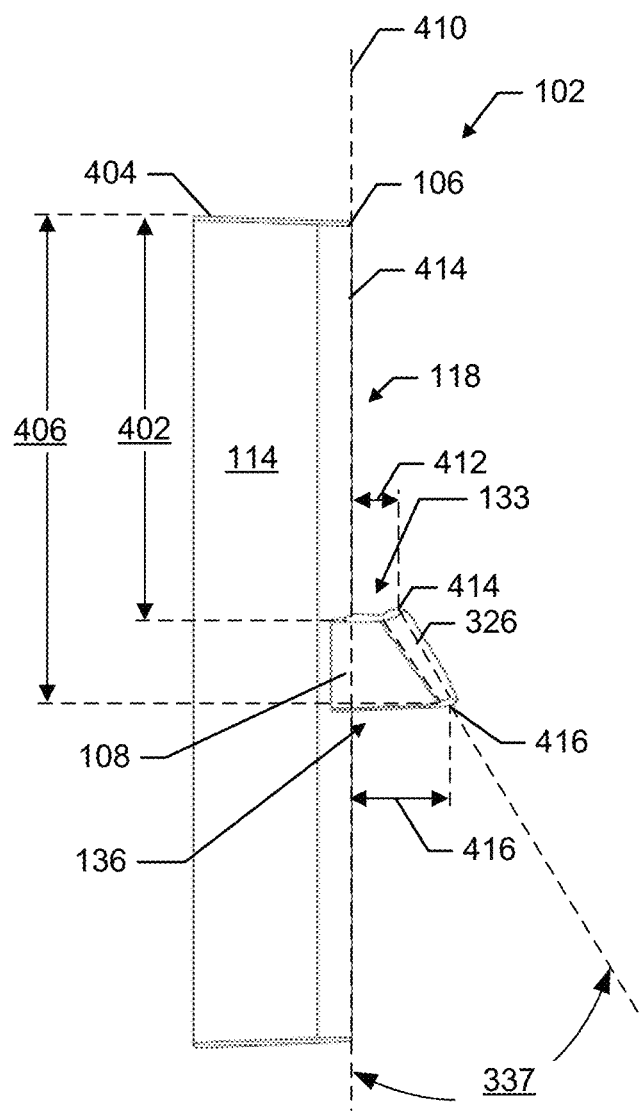
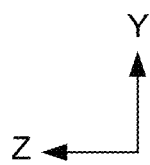
FIGURE 4

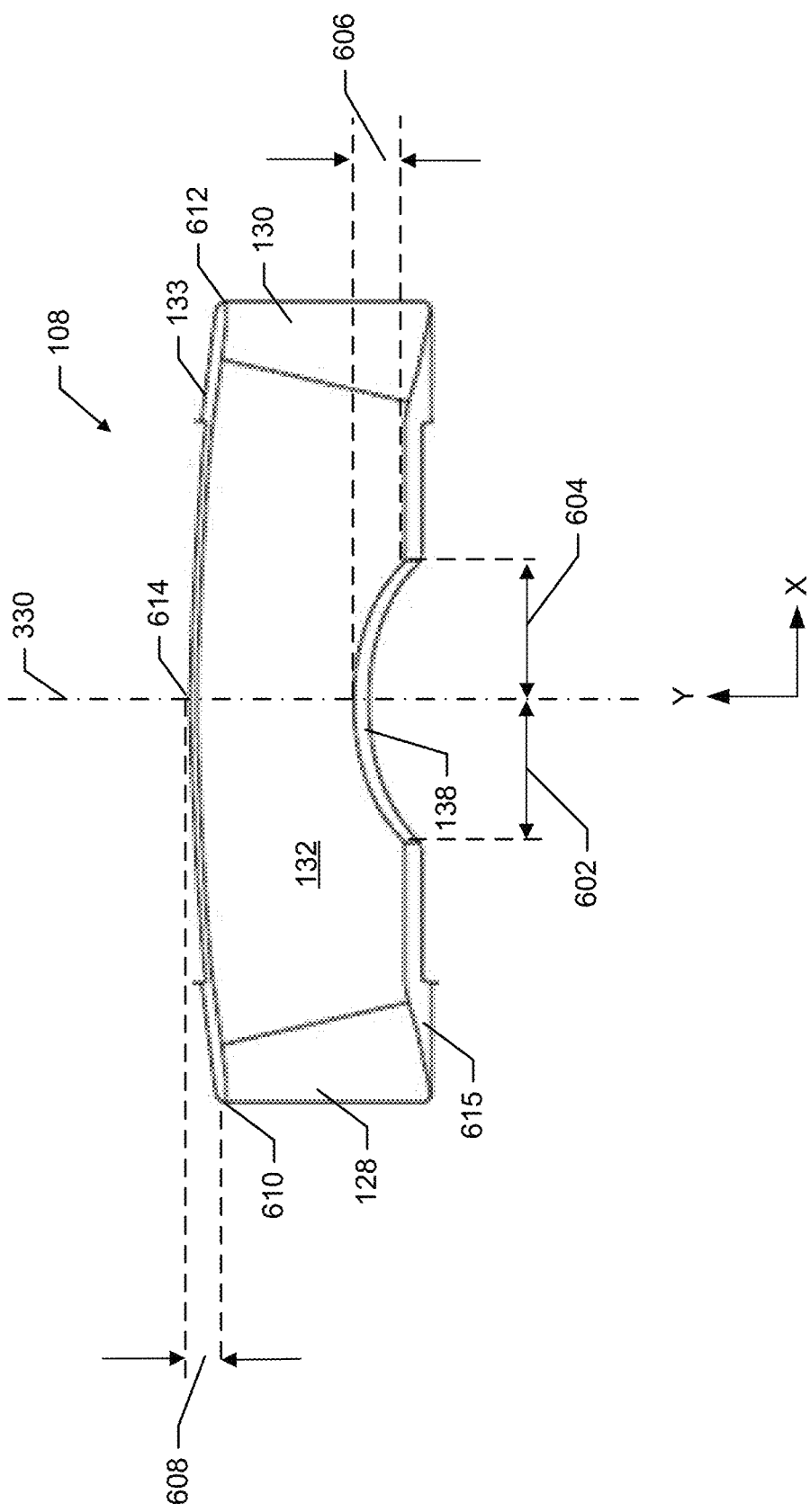

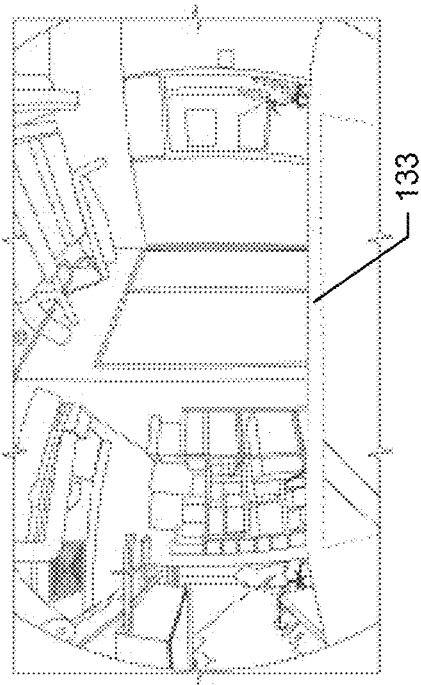
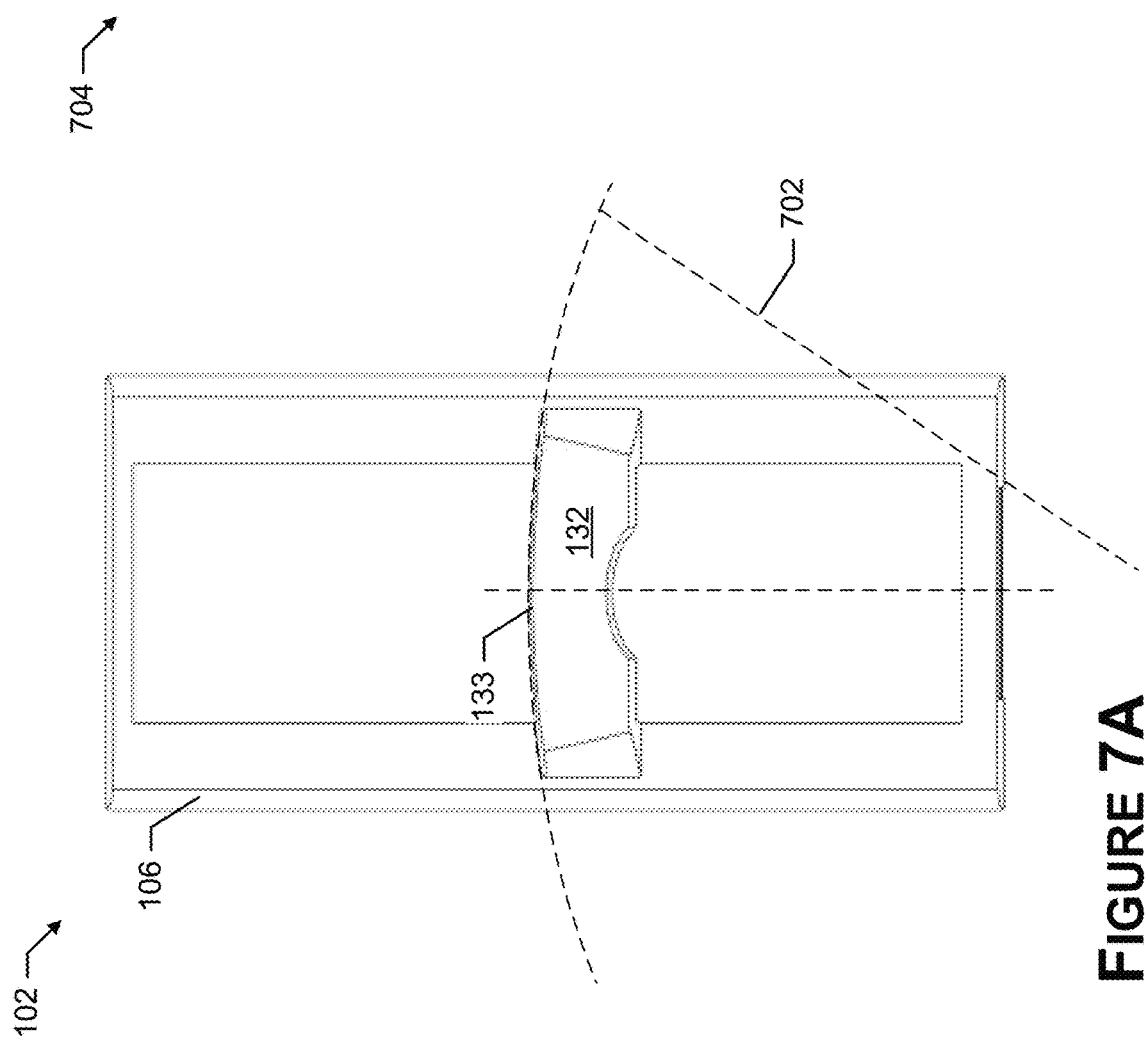
FIGURE 7B
FIGURE 7A

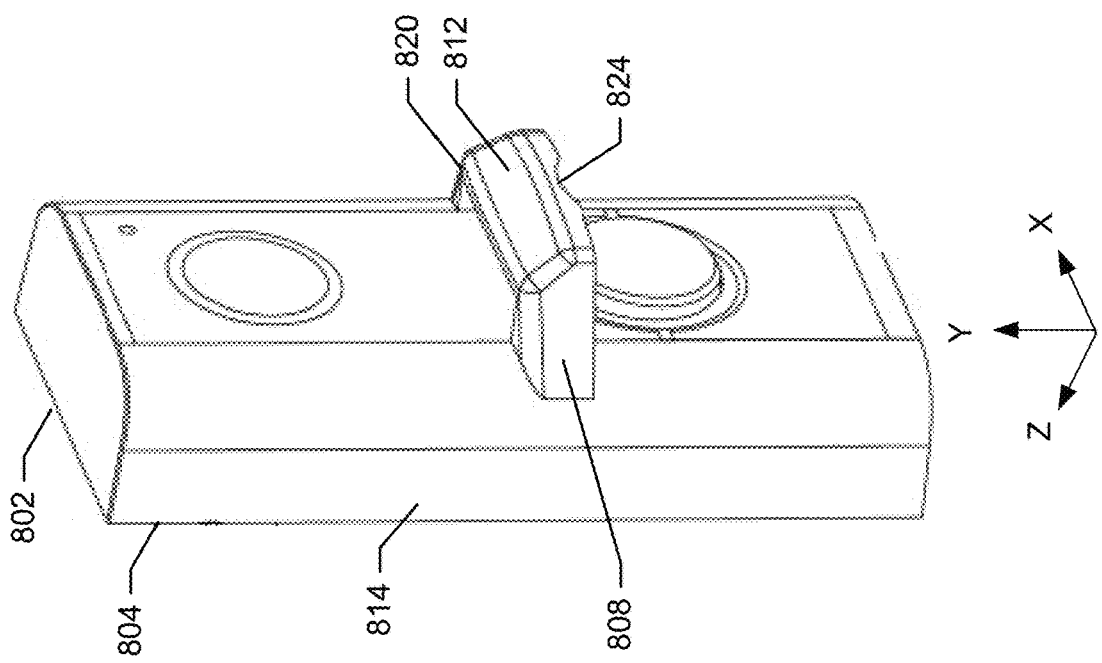
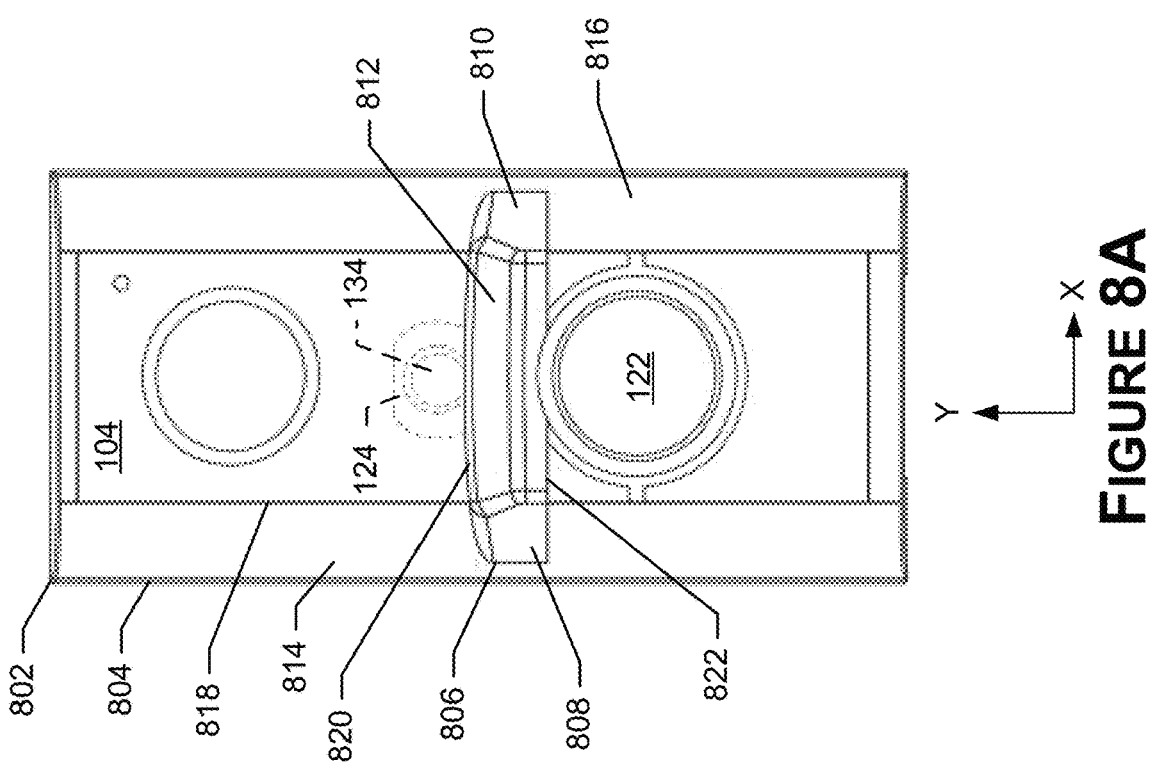

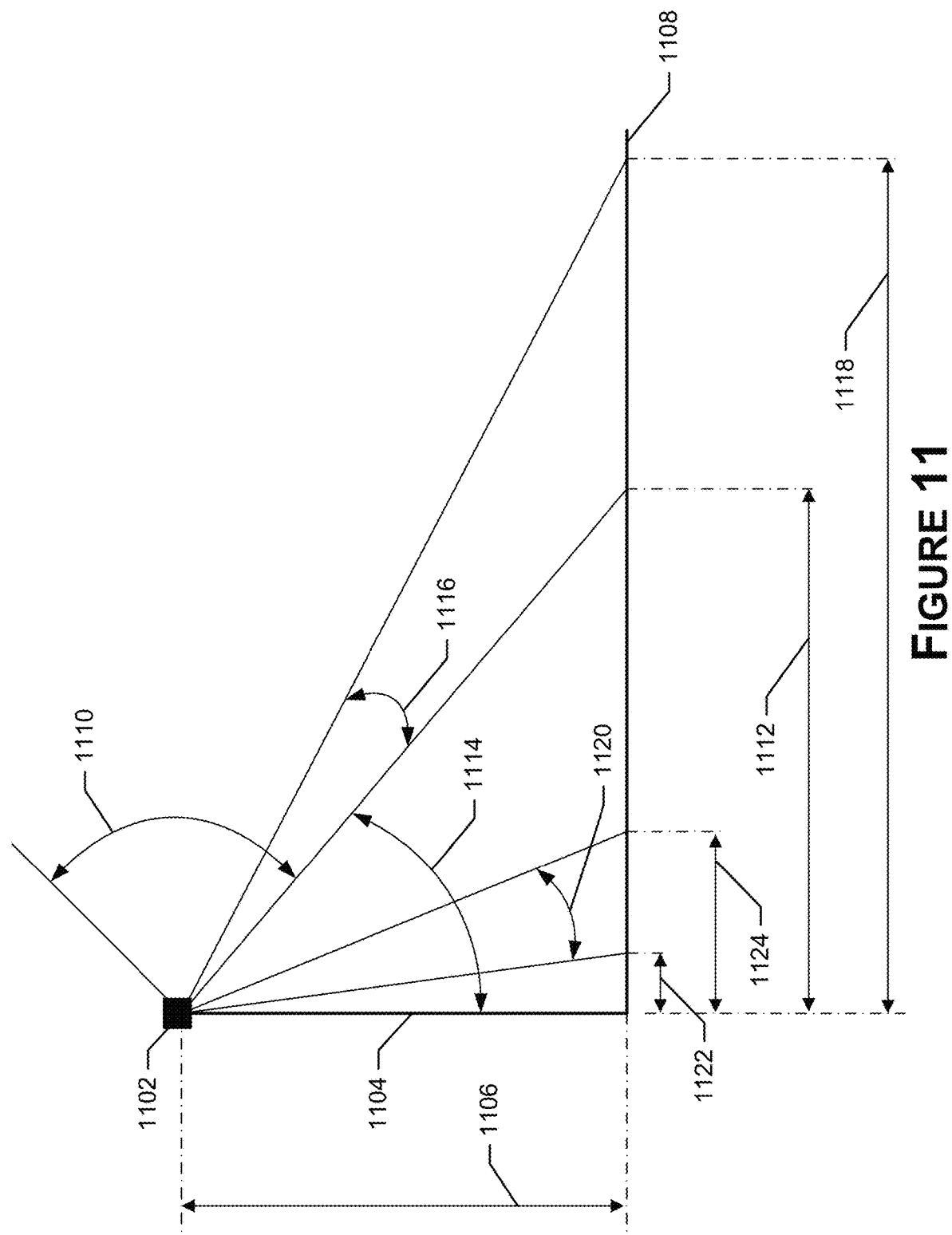

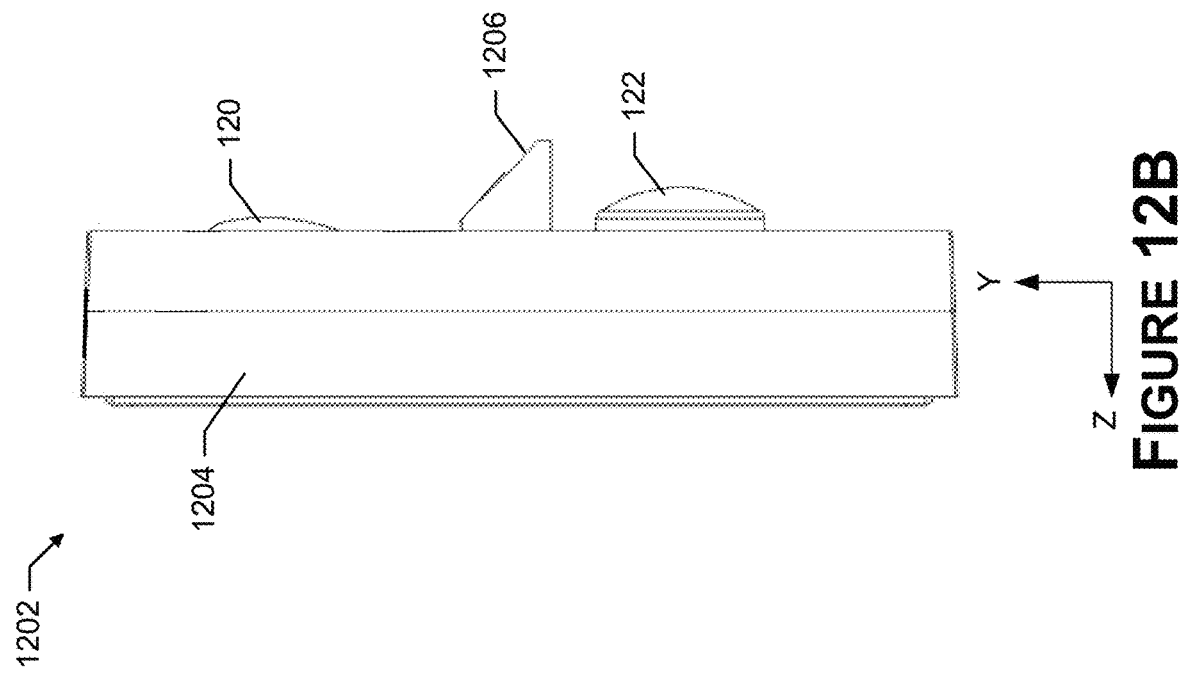
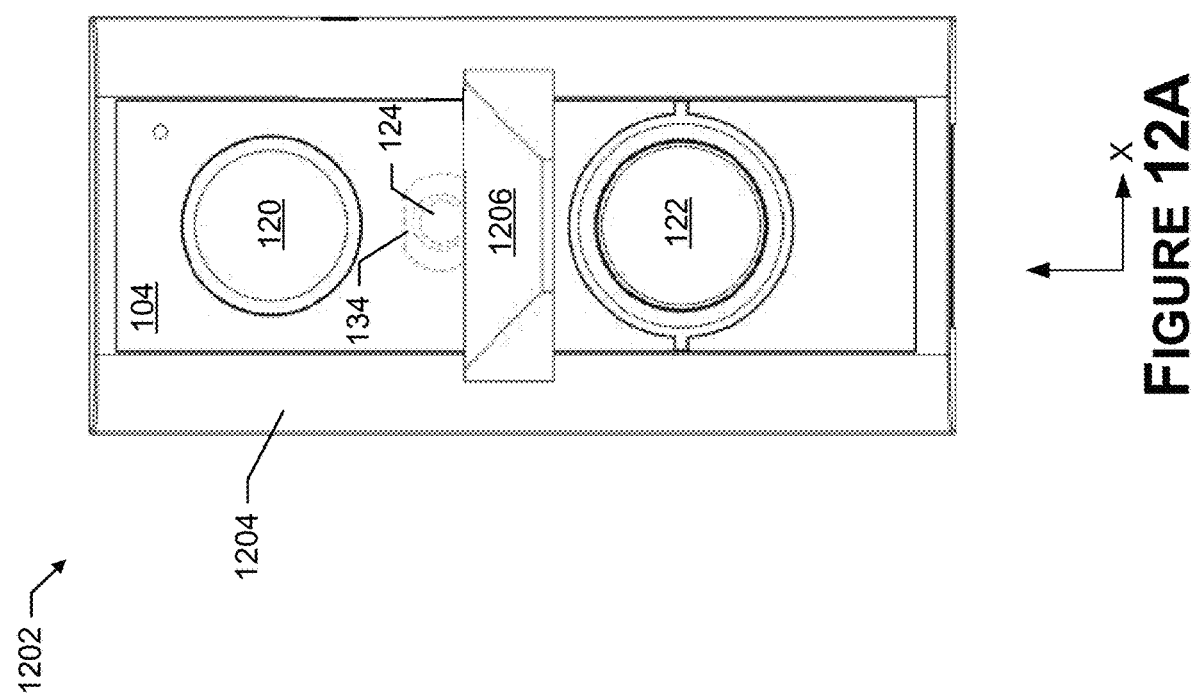

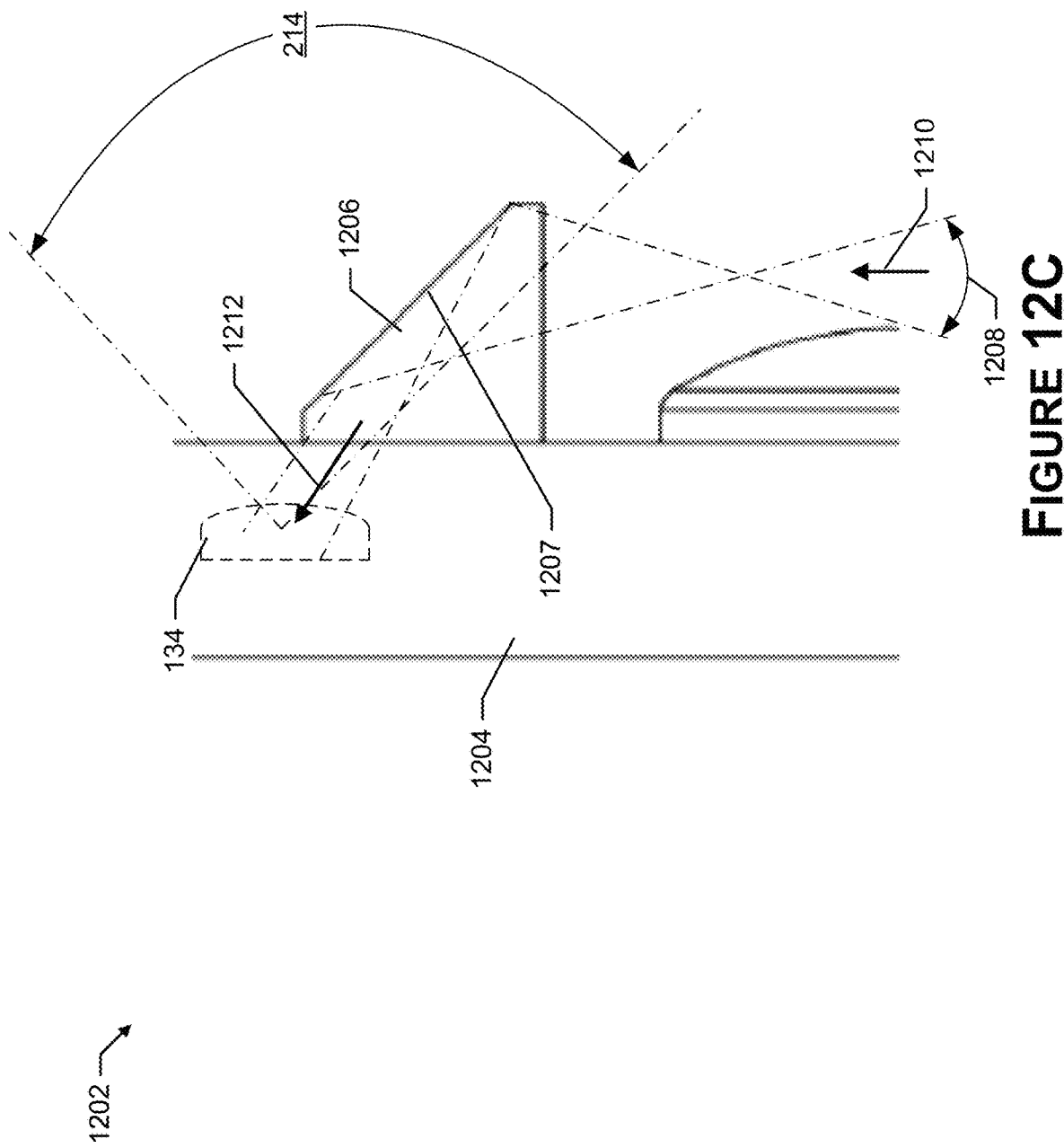

MIRROR APPARATUS FOR CAMERA DEVICES

BACKGROUND

Home security is a concern for many homeowners and renters. Those seeking to protect or monitor their homes often wish to have video and audio communications with visitors, for example, those visiting an external door or entryway. Audio/video recording and communication devices (A/V devices), such as doorbells, provide this functionality. For example, audio and/or video captured by an A/V device may be uploaded to the cloud and recorded on a server. A user of the A/V device may then later listen to the audio and/or view the video footage.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 4 is a left-side view of the mirror apparatus of FIG. 1, which includes dimensions indicating the location of the visor with respect to the frame, according to aspect(s) of the present disclosure.

FIG. 6A is a front view of the visor of the mirror apparatus of FIG. 1, according to aspect(s) of the present disclosure.

FIG. 7A is a front view of the mirror apparatus of FIG. 1, illustrating the curvature of the upper edge of the transverse member, according to aspect(s) of the present disclosure.

FIG. 7B is an image captured by a camera device when using the mirror apparatus of FIG. 7A, illustrating how the curvature of the upper edge of the transverse member corrects image distortions, according to aspect(s) of the present disclosure.

FIG. 8A is a front view of a first alternative mirror apparatus, according to aspect(s) of the present disclosure.

FIG. 8B is a front perspective view of the first alternative mirror apparatus of FIG. 8A, according to various aspect(s) of the present disclosure.

FIG. 11 is a schematic side view of a camera device including the present mirror apparatus, illustrating example fields of view of the camera device, according to aspect(s) of the present disclosure.

FIG. 12A is a front view of an apparatus including a reflective prism attached to a camera device, according to aspect(s) of the present disclosure.

FIG. 12B is a left-side view of the apparatus of FIG. 12A, according to aspects(s) of the present disclosure.

FIG. 12C is a left-side view of the apparatus of FIG. 12A illustrating light rays reflected from the prism, according to aspect(s) of the present disclosure.

DETAILED DESCRIPTION

Figure 1:
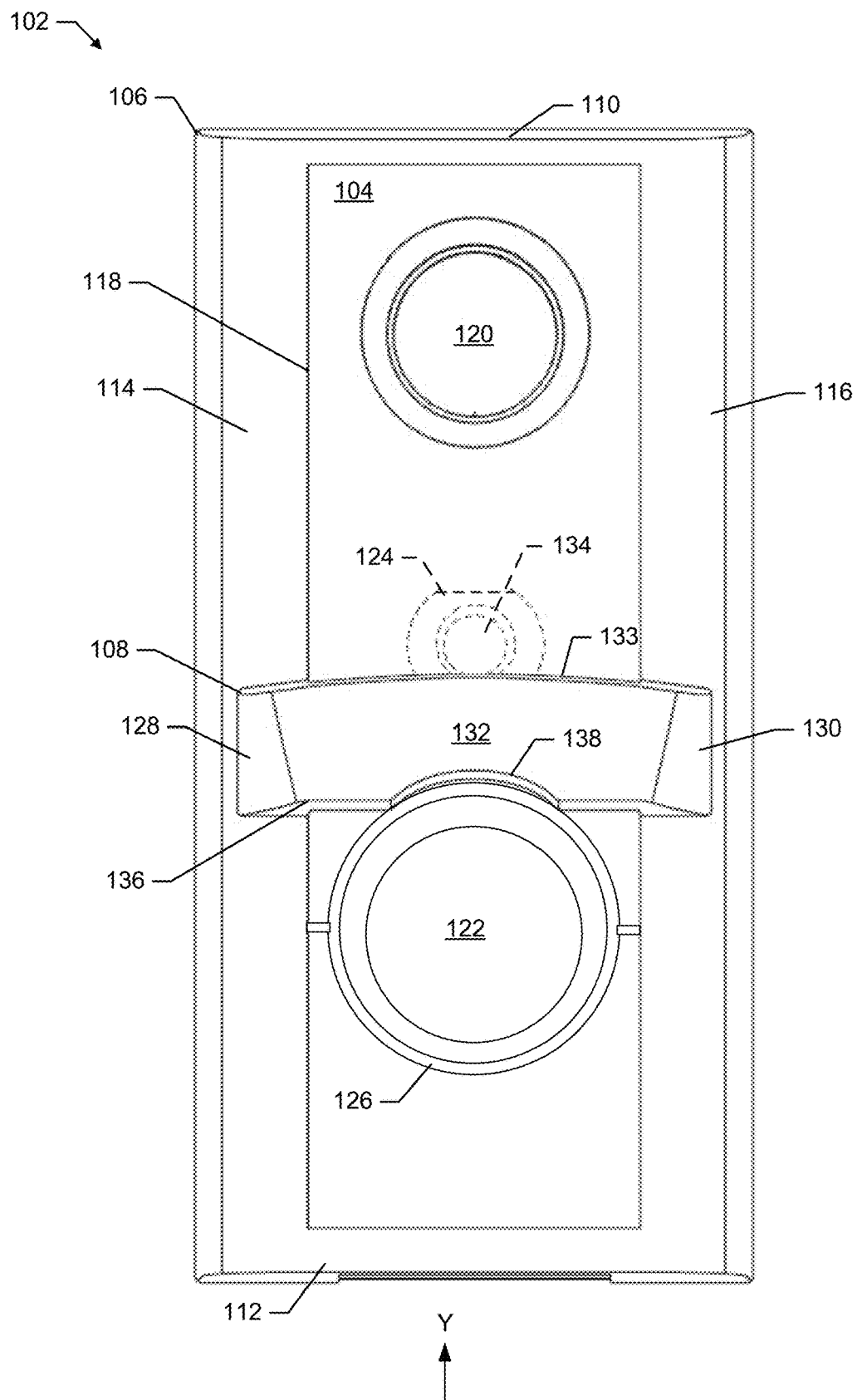
FIG. 1 illustrates a front view of an example mirror apparatus attached to a camera device, according to aspect(s) of the present disclosure.

This application describes an apparatus, such as a faceplate, that extends a field-of-view (FOV) of a camera of a camera device (e.g., an audio/video recording and communication device (A/V device), a security camera, and/or any other device that includes at least one camera). For instance, a user may place the camera device on a structure, such as a home, apartment, business, office, and/or the like. The camera device may then generate image data representing image(s) depicting the FOV of the camera. However, in some instances, based on where the camera device is located on the structure, the FOV may not include areas around the structure that are important for the user to monitor. For example, if the camera device is placed on and/or near an entrance of the structure, the FOV may not include the area of the ground that is located near the entrance. This area may be important for the user to monitor, such as when parcels (e.g., packages, letters, etc.) are left at the entrance of the structure.

As such, the application describes the apparatus that extends the FOV of the camera device. For instance, the camera may include a vertical FOV and a horizontal FOV. The vertical FOV may include, but is not limited to, 50 degrees, 89 degrees, 118 degrees, and/or any other angle. Additionally, the horizontal FOV may include, but is not limited to, 50 degrees, 100 degrees, 118 degrees, 150 degrees, and/or any other angle. The apparatus may extend one or more of the vertical FOV of the camera or the horizontal FOV of the camera. For example, the vertical FOV of the camera may not include the area that is located below and just in front of the camera device. The apparatus may thus "redirect" a portion of the vertical FOV of the camera to include this area that is located below and just in front of the camera device.

For more detail, the apparatus may include at least a frame and a visor. In some instances, the frame may be configured to attach to a front of the camera device. For example, the apparatus may include a faceplate that the user is able to attach to the camera device. The frame may include at least a top member, a bottom member, a first side member, and a second side member. The top member, the bottom member, the first side member, and the second side member may define edges of an opening that receives a front of the camera device when the apparatus is attached to the camera device. The opening may allow one or more input/output devices of the camera device to be unobstructed when the apparatus is attached to the camera device. The input/output device(s) may include, but are not limited to, the camera, motion sensor(s), input device(s) (e.g., a button), speaker(s), microphone(s), and/or the like.

The visor may attach to the frame. For instance, the visor may include a first support, a second support, and a transverse member. The first support of the visor may attach to the first side member of the frame and the second support of the visor may attach to the second side member of the frame. Additionally, the transverse member of the visor may extend between the first support and the second support. As such, the visor may extend over the opening of the frame. In some instances, the transverse member of the visor may be located at least partly within the FOV of the camera of the camera device when the apparatus is attached to the camera device. For example, the transverse member of the visor may obstruct the bottom 5 degrees, 10 degrees, 20 degrees, 30 degrees, and/or any other angle of the vertical FOV of the camera.

The transverse member of the visor may include a front surface, a back surface, a top edge, and a bottom edge. A reflective material may be located on the back surface of the transverse member. The reflective material may include, but is not limited to, a mirror, reflective plastic, reflective polyester, and/or any other material that is capable of reflecting light. In some instances, the back surface of the transverse member may be oriented at an angle with respect to a plane defined by the opening, such as a plane that is horizontal to the opening. As such, the reflective material, which is located on the back surface, is also oriented at the angle. The angle may include, but is not limited to, 20 degrees, 30 degrees, 31.5 degrees, 45 degrees, and/or any other angle. Since the transverse member of the visor is located at least partly within the FOV of the camera, the reflective material may be configured to reflect light from the area located below and just in front of the camera device to the camera. As such, the image data generated by the camera represents image(s) depicting the area below and just in front of the camera device. This causes the FOV of the camera to increase such that the FOV includes the area below and just in front of the camera.

In some instances, the transverse member of the visor and/or the reflective material may include a concave curvature. However, in other examples, the transverse member of the visor and/or the reflective material may include a triangular shape, a rectangular shape, a flat shape, and/or any other shape. The concave curvature of the reflective material may affect how the area located below and just in front of the camera device is depicted by the image(s). For example, by including the concave curvature, the area located below and just in front of the camera device may be depicted as a rectangle by the image(s).

In some instances, the bottom edge of the transverse member may include an indentation. The indentation may include, but is not limited to, an arcuate indentation, a square indentation, a rectangular indentation, a cylindrical indentation, a triangular indentation, and/or any other shape of indentation. In some instances, the transverse member of the visor includes the indentation in order for the transverse member to not obstruct one or more input/output devices of the camera device. For example, if the camera device includes an A/V doorbell, the camera device may include an input device, such as a doorbell button. The indentation on the transverse member may thus include the shape of the input device, such as an arcuate indentation, in order for the transverse member to not obstruct at least a portion of the input device. Additionally, in some instances, the camera device may include one or more lighting elements (e.g., a light ring) located around the input device. In such instances, the indentation may further cause the transverse member to not obstruct the one or more lighting elements.

Although the examples above describe the apparatus as including both the frame and the visor, in other examples, the apparatus may only include the visor. In such examples, the first support of the visor and/or the second support of the visor may include one or more detents for attaching the visor directly to the camera device. The one or more detents may include, but are not limited to, fasteners (e.g., screws, snap-fits, tab-and-slot engagements, etc.), adhesives, pressure-fits, and/or any other type of detents. Additionally, in these examples, the camera device may include one or more detents (e.g., hooks, tabs, etc.) that engage with the corresponding detents of the visor.

By attaching the apparatus to the camera device, the user is able to extend the FOV of the camera of the camera device, such as when the user wants to view the area located below and just in front of the camera device. The user may want to view this area when the camera device is located over an entrance to a structure, when the user is expecting delivery of a parcel, when the user has one or more objects located within the area, and/or for one or more other reasons. Additionally, since the apparatus may be removed from the camera device, the user is able to remove the apparatus when the user is no longer interested in viewing the area. For example, the user may install the apparatus at times when the user is expecting delivery of a parcel, but remove the apparatus at times when the user is not expecting a delivery.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front view of an example mirror apparatus 102 attached to a camera device 104, according to aspect(s) of the present disclosure. In the illustrated embodiment, the camera device 104 is an A/V doorbell, and includes a viewer 120, a button 122, a camera 124, and a light ring 126. Further details of the illustrated camera device 104 are described in U.S. patent application Ser. No. 16/218,920, filed on Dec. 13, 2018. The illustrated camera device 104 is, however, only one example of a device with which the present mirror apparatus 102 may be used, and should not be construed as limiting.

The mirror apparatus 102 may include a frame 106 and a visor 108. The frame 106 may include at least a top member 110, a bottom member 112, a first side member 114, and a second side member 116. In reference to the Cartesian Coordinate System (X, Y, Z), the top member 110 may be spaced apart from the bottom member 112 in the Y-direction and the first side member 114 may be spaced apart from the second side member 116 in the X-direction. As shown, the frame 106 may include a rectangular shape. However, in other examples, the frame 106 may include a square shape, a circular shape, a triangular shape, and/or any other type of shape.

When attached to the camera device 104, the top member 110, the bottom member 112, the first side member 114, and/or the second side member 116 may at least partially wrap around a portion of the camera device 104, which may help secure the mirror apparatus 102 to the camera device 104. The top member 110, the bottom member 112, the first side member 114, and the second side member 116 may define the edges of an opening 118 that receives a front of the camera device 104. The opening 118 may allow the button 122 of the camera device 104 to be unobstructed when the mirror apparatus 102 is attached to the camera device 104.

In some examples, the visor 108 and the frame 106 are molded together to create a single structure. For instance, the visor 108 may include a first support 128, a second support 130, and a transverse member 132. The first support 128 of the visor 108 may extend from the first side member 114 of the frame 106 and the second support 130 of the visor 108 may extend from the second side member 116 of the frame 106. Additionally, the transverse member 132 of the visor 108 may extend between the first support 128 and the second support 130. As such, the visor 108 may extend across the opening 118 of the frame 106. In the example of FIG. 1, the transverse member 132 of the visor 108 is located at least partly within a FOV of the camera 124 of the camera device 104. For example, the transverse member 132 of the visor 108 may obstruct the bottom 5 degrees, 10 degrees, 20 degrees, 30 degrees, and/or any other angle of the FOV of the camera 124.

In other examples, the visor 108 may be separate from, and attach to, the frame 106. For instance, the first support 128 of the visor 108 may attach to, and extend from, the first side member 114 of the frame 106. Additionally, the second support 130 of the visor 108 may attach to, and extend from, the second side member 116 of the frame 106. In such examples, the first support 128 and/or the second support 130 may include one or more detents for attaching the visor 108 to the frame 106. The one or more detents may include, but are not limited to, fasteners (e.g., screws, snap-fits, tab-and-slot engagements, etc.), adhesives, pressure-fits, and/or any other type of detents. Additionally, the frame 106 may include one or more detents (e.g., hooks, tabs, etc.) that engage with the corresponding detents of the visor 108.

The transverse member 132 of the visor 108 may be oriented at an oblique angle with respect to a plane defined by the opening 118 (e.g., a plane perpendicular to the Z-direction) and/or with respect to an axis of a lens 134 of the camera 124. An oblique angle may include an angle that is not a right angle nor a multiple of a right angle. For instance, the angle may include, but is not limited to, 20 degrees, 30 degrees, 31.5 degrees, 45 degrees, and/or any other angle. As described below, a back surface of the transverse member 132 (which is illustrated at least in FIG. 3D) may comprise a reflective material. A reflective material may include any material that is capable casting back light rays that impinge upon the reflective material. The reflective material may include, but is not limited to, a mirror, reflective plastic, reflective polyester, and/or any other material that is capable of casting back light. As such, and since the transverse member 132 of the visor 108 is located at least partly within the FOV of the camera 124, the reflective material may reflect light from the area 214 below and just in front of the camera device 104 into the lens 134 of the camera 124.

In the example of FIG. 1, an upper edge 133 of the transverse member 132 of the visor 108 includes a convex curvature. As described in further detail below, the curvature may correct any image distortion caused by the lens 134 of the camera 124, so that the upper edge 133 appears to be straight in the images recorded by the camera 124 when viewed on the client device. However, in other examples, the upper edge 133 of the transverse member 132 may be straight, or have another type or degree of curvature.

In some instances, a bottom edge 136 of the transverse member 132 may include an indentation 138. In the illustrated embodiment, the indentation 138 has an arcuate shape. However, in other examples, the indentation 138 may have another shape, such as octagonal, hexagonal, rectangular, triangular, or any other shape. In some instances, the transverse member 132 of the visor 108 includes the indentation 138 so that the transverse member 132 does not obstruct the visibility of one or more input/output devices of the camera device 104. For example, and as shown in the example of FIG. 1, because the transverse member 132 includes the arcuate indentation 138, the transverse member 132 does not obstruct the visibility of the button 122 and/or the light ring 126 of the camera device 104. In other words, the button 122 and/or the light ring 126 may be visible even when the mirror apparatus 102 is attached to the camera device 104.

In some instances, the visor 108 may be detachable from the frame 106. For example, the camera device 104 may be manufactured to include the frame 106 and/or the frame 106 may attach to the camera device 104 separately from the visor 108. The visor 108 may then include one or more detents (which are illustrated at least in FIG. 3D) for attaching the visor 108 to the frame 106.

Figure 2:
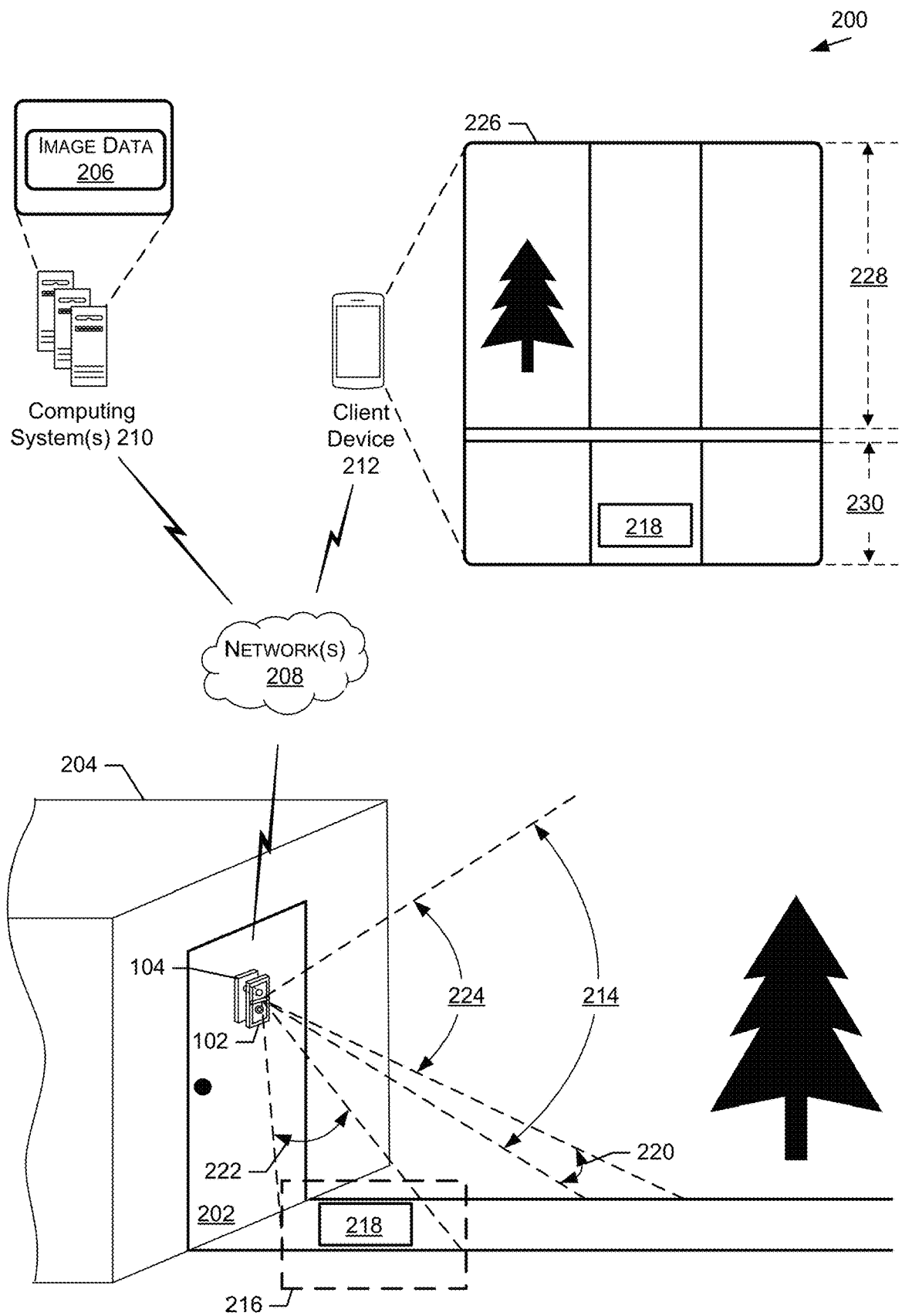
FIG. 2 illustrates an example environment that includes a camera device, which includes an attached mirror apparatus, generating image data, according to aspect(s) of the present disclosure.

FIG. 2 illustrates an example environment 200 that includes the camera device 104, with the attached mirror apparatus 102, generating image data 206, according to aspect(s) of the present disclosure. In the example of FIG. 2, a user may place the camera device 104 on an entrance 202 (e.g., a door) of a structure 204 (e.g., a home). The camera device 104 may generate image data 206 representing image(s) depicting the environment 200. For example, when the camera device 104 detects motion of an object, the camera device 104 may begin generating the image data 206 and then send the image data 206, over one or more network(s) 208, to one or more computing system(s) 210. The computing system(s) 210 may then send the image data 206 to a client device 212 (e.g., a smartphone).

As shown, the camera device 104 without the attached mirror apparatus 102 may have a first FOV 214 that does not include an area 216 located below and just in front of the camera device 104. As such, the image(s) represented by the image data 206 may not depict the area 216. However, in some circumstances, such as when there is a parcel 218 located within the area 216, the user may want the image(s) to depict the area 216, such that the user is able to monitor the parcel 218 after delivery. As such, the mirror apparatus 102 may extend the FOV of the camera device 104 to include the area 216.

For example, the mirror apparatus 102 may obstruct a portion 220 of the first FOV 214 of the camera device 104. However, the mirror apparatus 102 may extend the FOV of the camera device 104 to include an additional FOV 222. As such, when the mirror apparatus 102 is attached to the camera device 104, the total FOV of the camera device 104 may include a portion 224 of the first FOV 214 as well as the additional FOV 222 provided by the mirror apparatus 102. As shown, the additional FOV 222 may include the area 216 located below and just in front of the camera device 104. As such, the image(s) represented by the image data 206 may depict the area 216 located below and just in front of the camera device 104.

For example, and as illustrated in the example of FIG. 2, the client device 212 may display image(s) 226 represented by the image data 206. A first portion 228 of the image(s) 226 may represent the portion 224 of the first FOV 214, and a second portion 230 of the image(s) 226 may represent the additional FOV 222 provided by the mirror apparatus 102.

Figure 3B:
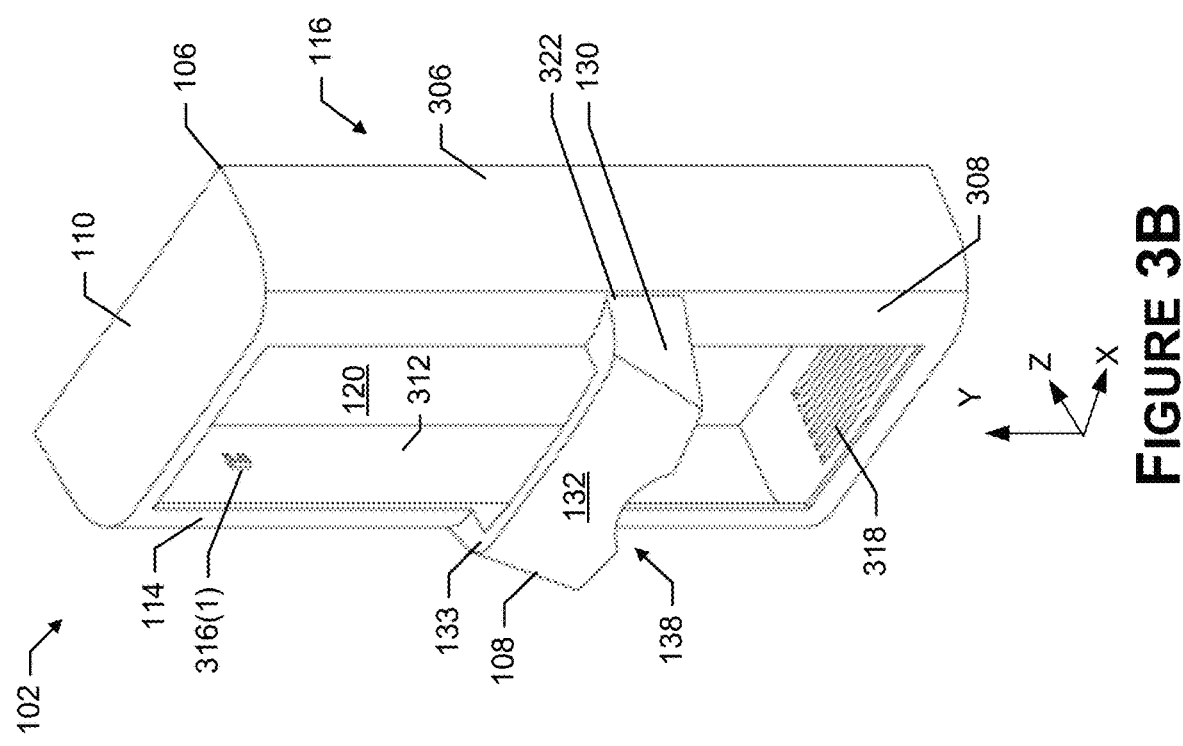
FIG. 3B is a front perspective view of the mirror apparatus of FIG. 1, according to aspect(s) of the present disclosure.
Figure 3A:
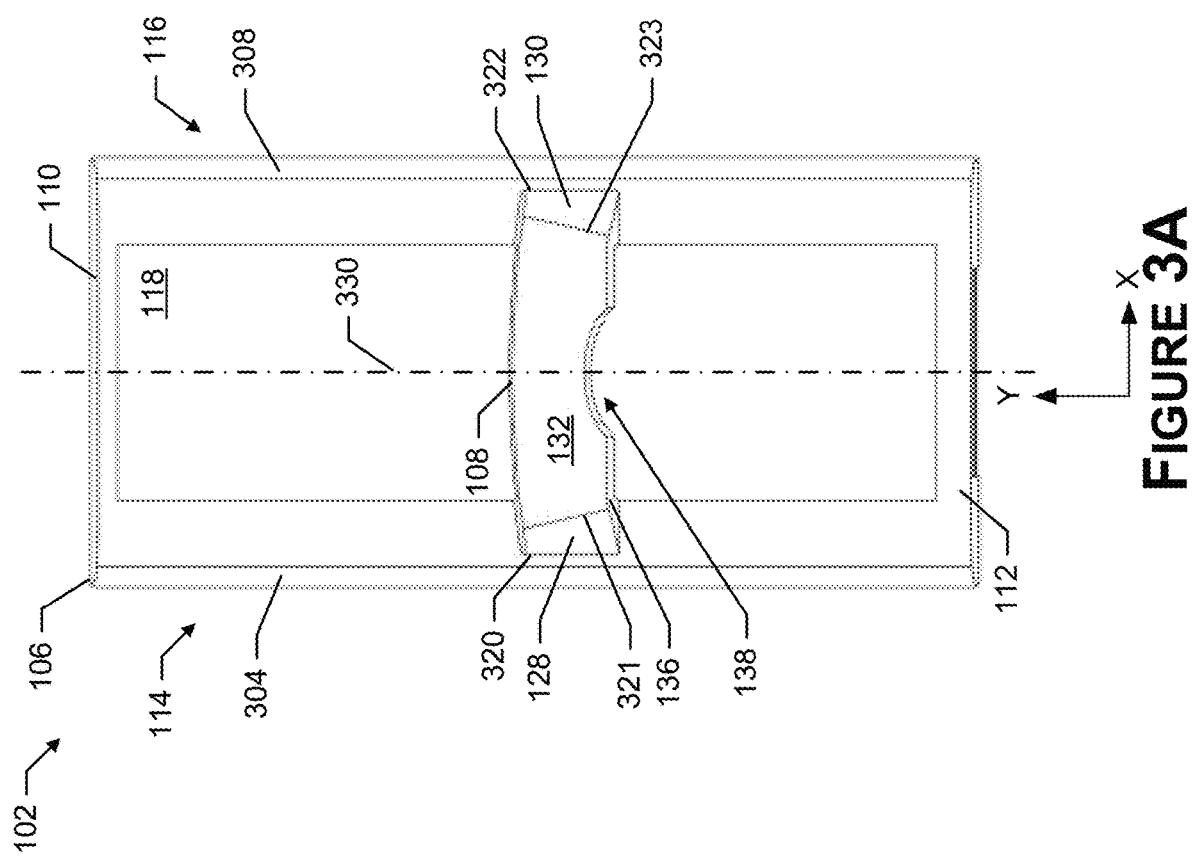
FIG. 3A is a front view of the mirror apparatus of FIG. 1, according to aspect(s) of the present disclosure.
Figure 3D:
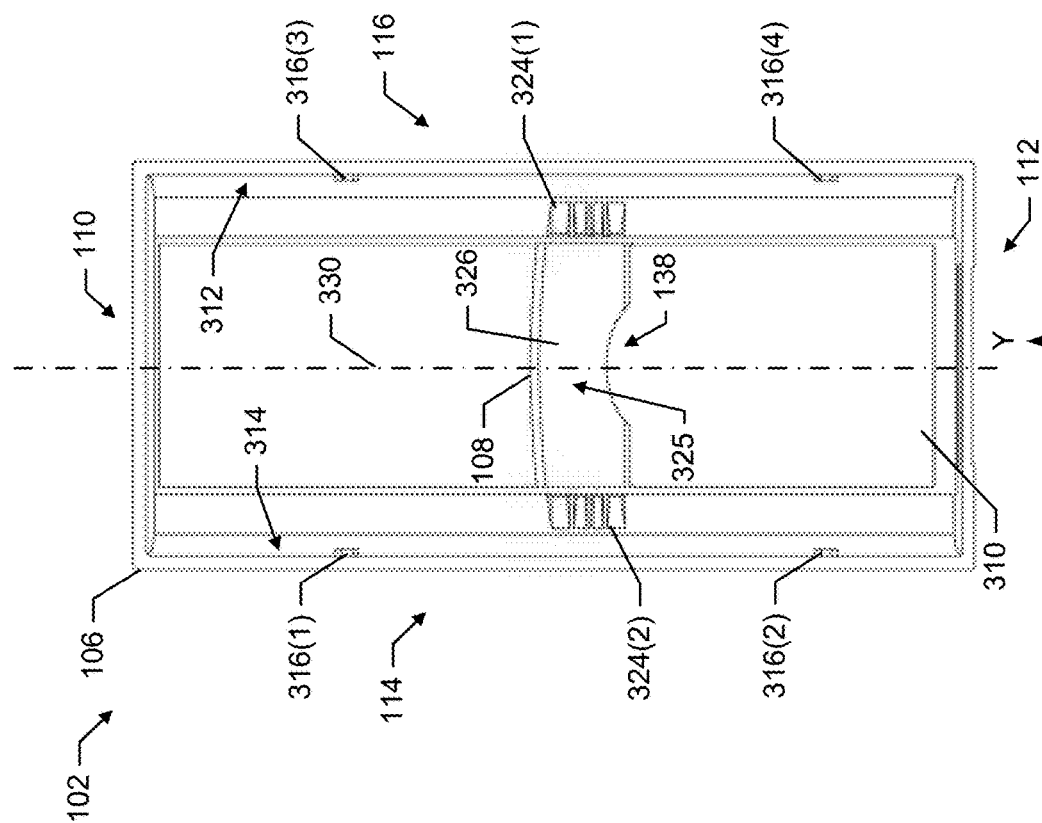
FIG. 3D is a back view of the mirror apparatus of FIG. 1, according to aspect(s) of the present disclosure.
Figure 3C:
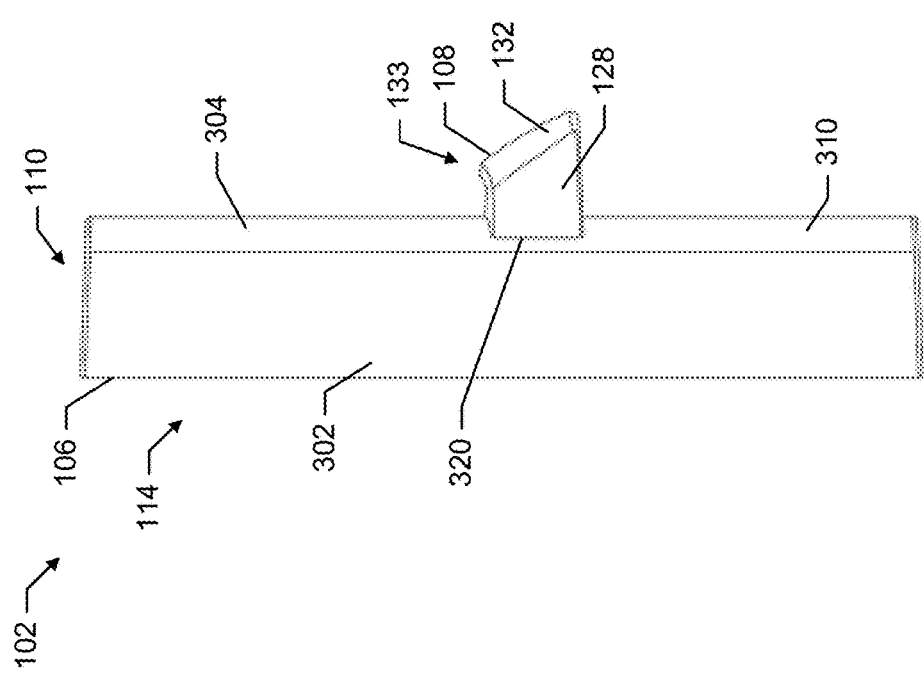
FIG. 3C is a left-side view of the mirror apparatus of FIG. 1, according to aspect(s) of the present disclosure.
Figure 3F:
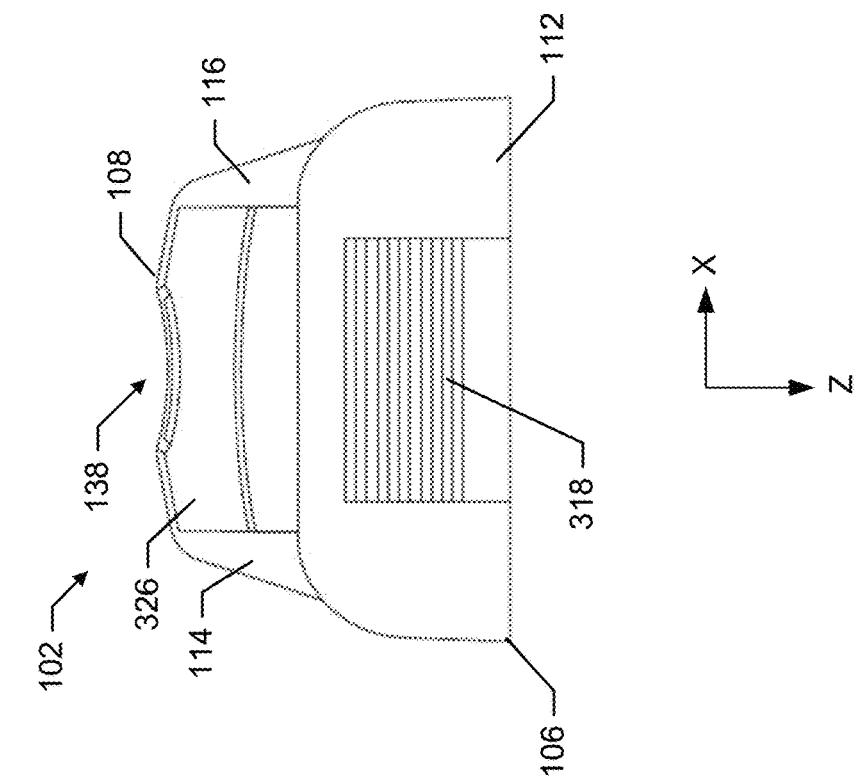
FIG. 3F is a bottom view of the mirror apparatus of FIG. 1, according to aspect(s) of the present disclosure.
Figure 3E:
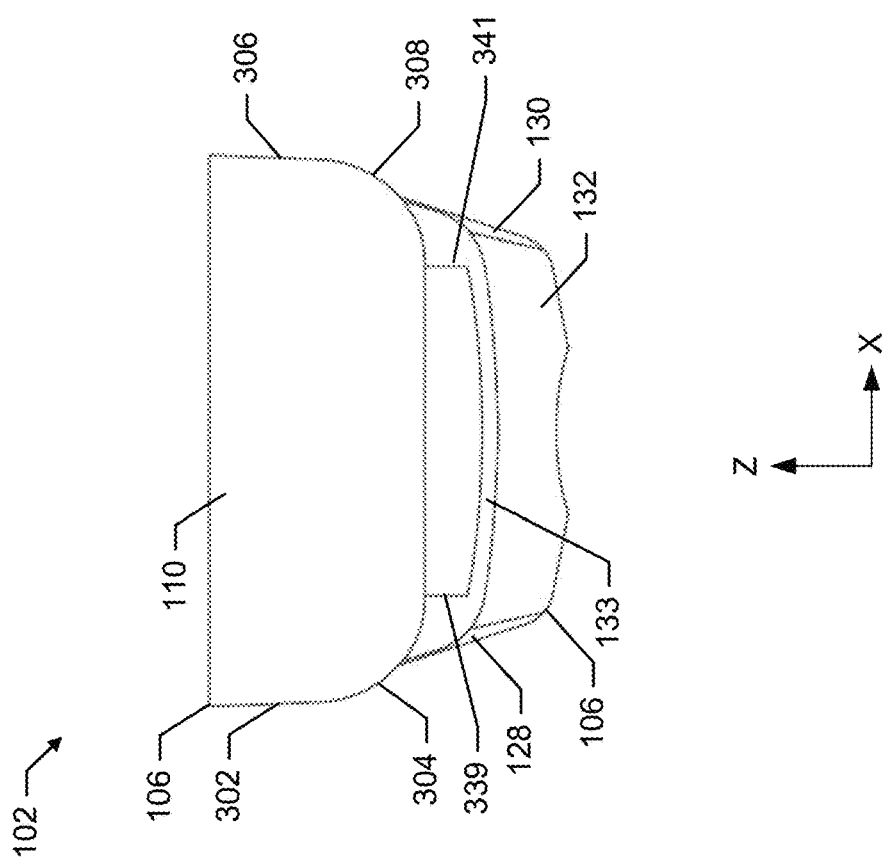
FIG. 3E is a top view of the mirror apparatus of FIG. 1, according to aspect(s) of the present disclosure.
Figure 3I:
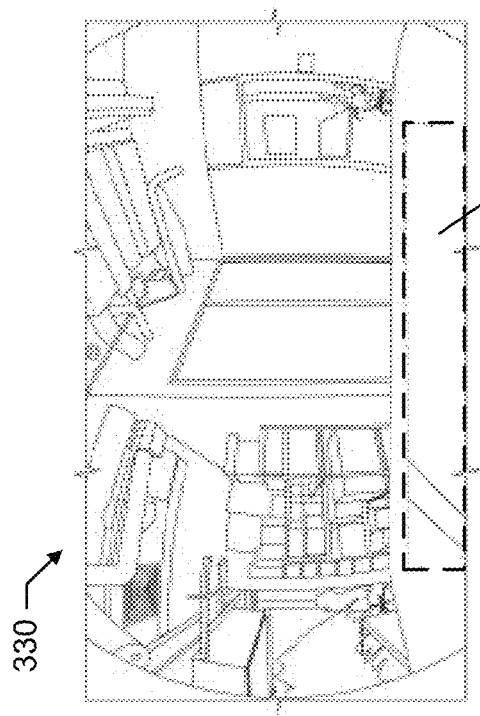
FIG. 3I is an image captured by a camera device using the mirror apparatus of FIGS. 3A-3H, according to aspect(s) of the present disclosure.

FIGS. 3A-3H are various views of the mirror apparatus 102 of FIG. 1, and FIG. 3I is an image captured by a camera device using the mirror apparatus of FIGS. 3A-3H, according to aspect(s) of the present disclosure. As shown, the mirror apparatus 102 includes the frame 106 and the visor 108. As discussed herein, the frame 106 may include the top member 110, the bottom member 112, the first side member 114, and the second side member 116.

As shown, the top member 110 and the bottom member 112 may be substantially planar. Additionally, the first side member 114 may include a substantially planar portion 302 and a curved portion 304. Furthermore, the second side member 116 may include a substantially planar portion 306 and a curved portion 308. The top member 110, the bottom member 112, the curved portion 304 of the first side member 114, and the curved portion 308 of the second side member 116 may define the edges of the opening 118. Additionally, the top member 110, the bottom member 112, the substantially planar portion 302 of the first side member 114, and the substantially planar portion 306 of the second side member 116 may define a second opening 310 located on a back of the frame 106.

As shown, an inner portion 312 of the first side member 114 and an inner portion 314 of the second side member 116 include detents 316(1)-(4) for attaching the mirror apparatus 102 to the camera device 104. The detents 316(1)-(4) may include, but are not limited to, snap-fits, tab-and-slot engagements, etc. In some examples, the camera device 104 includes one or more detents (e.g., hooks, tabs, etc.) that engage with the corresponding detents 316(1)-(4) of the frame 106.

The bottom member 112 of the frame 106 may include one or more openings 318. In various embodiments, the openings 318 may facilitate the passage of sound through the bottom member 112 of the frame 106 of the mirror apparatus 102. For example, the bottom of the camera device 104 may include one or more microphone(s) and/or speaker(s), and the bottom member 112 of the frame 106 may be disposed over the microphone(s) and/or the speaker(s). The openings 318 may enable sound from the speaker(s) to be audible to a person located near the camera device 104, and may similarly enable sound originating from near the camera device 104 to be detected by the microphone(s).

As discussed herein, the visor 108 may include the first support 128, the second support 130, and the transverse member 132. The visor 108 and the frame 106 are molded together to create a single structure. For example, the first support 128 and the second support 130 extend forward (e.g., in the Z-direction) from the frame 106. For example, the first support 128 extends from the first side member 114 at a first end 320 of the first support 128, and the second support 130 extends from the second side member 116 at a first end 322 of the second support 130. The transverse member 132 of the visor 108 extends between a second end 321 of the first support 128 and a second end 323 of the second support 130. In other words, the transverse member 132 is spaced apart from the frame 106 in a direction (e.g., the Z-direction) perpendicular to the plane defined by the opening 118 of the frame 106, and the transverse member 132 extends across the opening 118 of the frame 106.

Figure 3H:
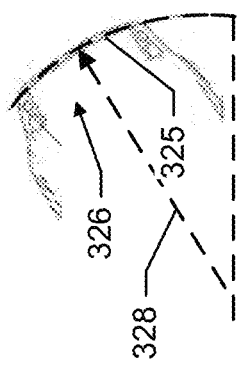
FIG. 3H is a cross-sectional view of the mirror apparatus of FIG. 3G, taken through the line B-B in FIG. 3G, according to aspect(s) of the present disclosure.
Figure 3G:
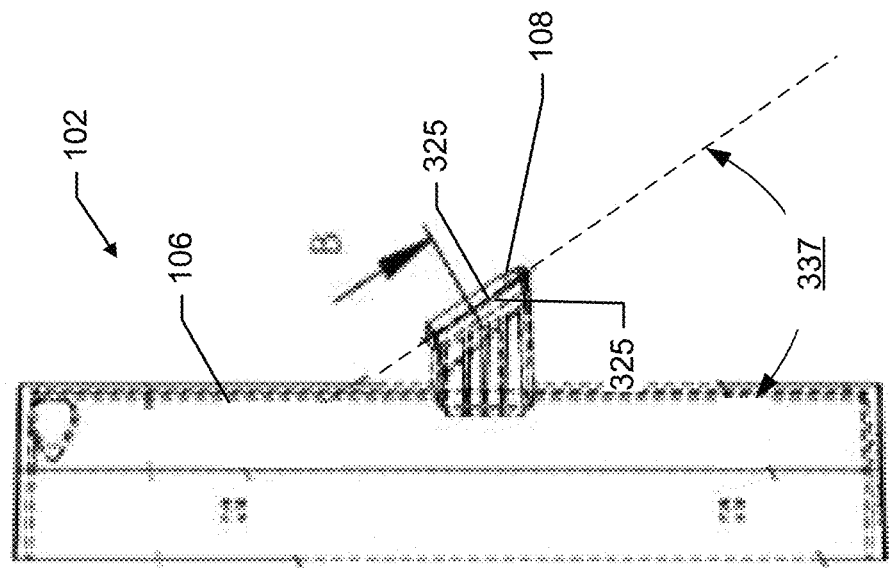
FIG. 3G is a left-side cross-sectional view of the mirror apparatus of FIG. 1, according to aspect(s) of the present disclosure.

As shown in the example of FIG. 3G, the transverse member 132 includes a back surface 325 (may also be referred to as inner surface, or surface that faces the opening 118) having a concave curvature when viewed along an axis parallel to the arrows B-B. Additionally, the back surface 325 and a mirror portion 326 of the back surface 325 of the transverse member 132 may be oriented at an oblique angle 337 with respect to the plane defined by the opening 118. For instance, as shown in FIG. 3H, which is a cross-sectional view of the mirror apparatus of FIG. 3G, taken through the line B-B in FIG. 3G, the back surface 325 may include a radius of curvature 328, such as, but not limited to, 60 centimeters, 65.97 centimeters, 70 centimeters, and/or any other length. This concave curvature shape corrects lens distortion such that a portion 332 of an image 330 captured by the camera device 104, which portion 332 represents light rays reflected from the mirror portion 326, appears substantially rectangular. The portion 332 of the image 330 represents the area 216 (FIG. 2) that is located below and just in front of the camera device 104.

In some examples, the mirror portion 326 may cover a back surface 339 of the first support 128, a back surface 341 of the second support 130, and the back surface 325 of the transverse member 132. In other examples, the mirror portion 326 may cover only the back surface 325 of the transverse member 132, but may not cover the back surface 339 of the first support 128 and/or the back surface 341 of the second support 130. In these examples, the mirror portion 326 may not cover specific surfaces of the visor 108 in order to reduce the amount of light that is reflected by the mirror portion 326 to the camera 124 of the camera device 104.

In the example of FIGS. 3A-3H, the upper edge 133 of the transverse member 132 may be curved, and the bottom edge 136 of the transverse member 132 may include the indentation 138. In some examples, the indentation 138 may be centered on a vertical axis 330 of the mirror apparatus 102 in the front view of FIG. 3A.

FIG. 4 is a side view of the mirror apparatus 102 of FIG. 1, which includes dimensions indicating the location of the visor 108 with respect to the frame 106, according to aspect(s) of the present disclosure. As shown, the visor 108 may be attached to the frame 106 such that the upper edge 133 of the transverse member 132 of the visor 108 is spaced a first distance 402 from a top surface 404 of the frame 106, and the bottom edge 136 of the transverse member 132 of the visor 108 is spaced a second distance 406 from the top surface 404 of the frame 106. The first distance 402 may include, but is not limited to, 40 millimeters, 44.49 millimeters, 50 millimeters, or any other distance. Additionally, the second distance 406 may include, but is not limited to, 50 millimeters, 54.19 millimeters, 60 millimeters, or any other distance.

Additionally, and as described herein, the mirror portion 326 of the transverse member 132 of the visor 108 may be oriented at the oblique angle 337 with respect to a plane 410 defined by the opening 118. The oblique angle 337 may include, but is not limited to, 30 degrees, 31.5 degrees, 40 degrees, 48.5 degrees, 50 degrees, 60 degrees, and/or any other angle. As such, the middle 414 of the upper edge 133 of the transverse member 132 may be spaced by a third distance 412 from the plane 410 defined by the opening 118, and a middle 416 of the bottom edge 136 of the transverse member 132 may be spaced by a fourth distance 416 from the plane 410 defined by the opening 118. The third distance 412 may include, but is not limited to, 4 millimeters, 6.14 millimeters, 10 millimeters, or any other distance. Additionally, the fourth distance 416 may include, but is not limited to, 10 millimeters, 11.87 millimeters, 15 millimeters, or any other distance.

Figure 5:
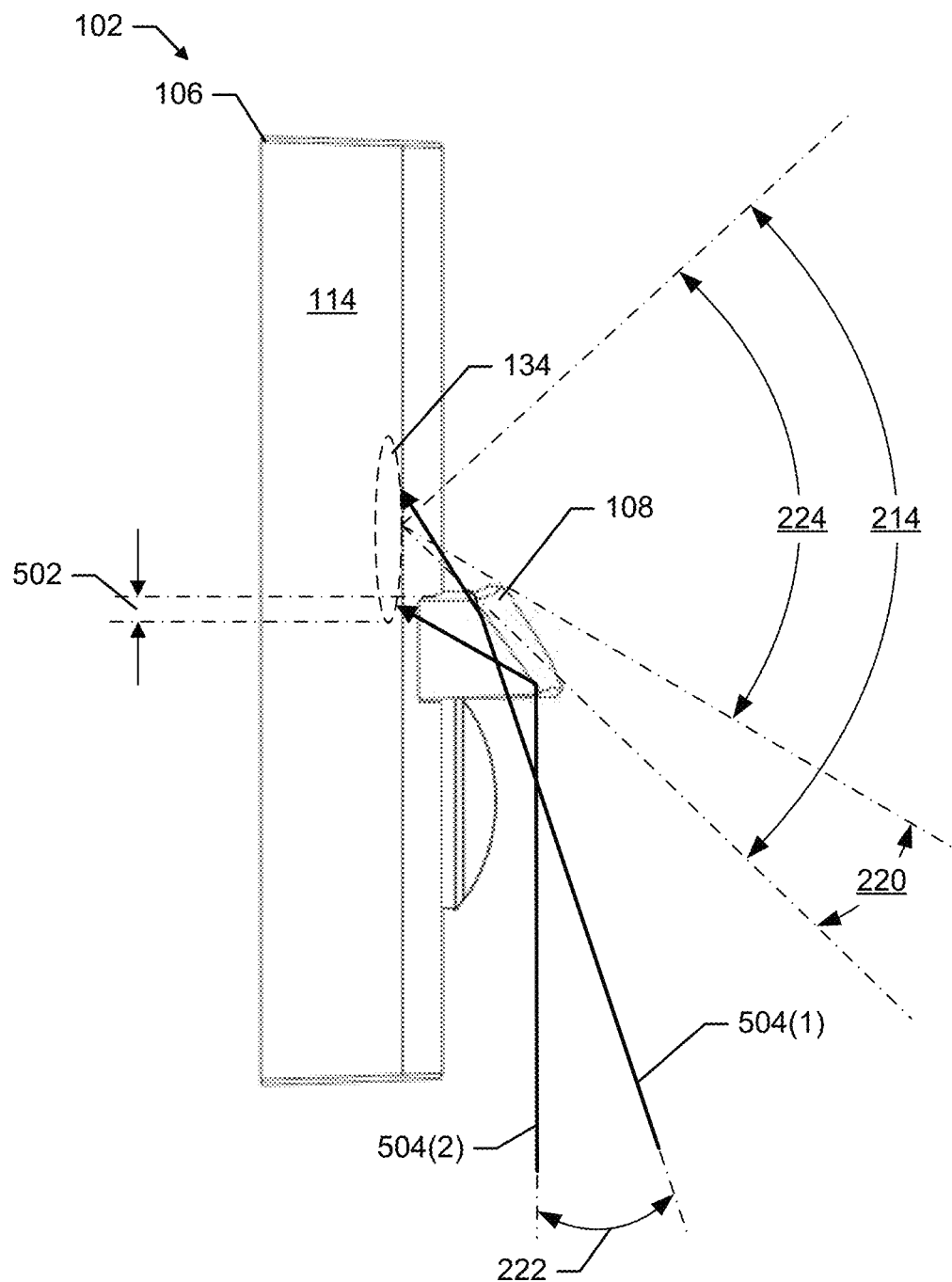
FIG. 5 is a left-side view of the mirror apparatus of FIG. 1, which illustrates the field-of-view of the camera device, according to aspect(s) of the present disclosure.

FIG. 5 is a side view of the mirror apparatus 102 of FIG. 1, illustrating the FOV of the camera device 104, according to aspect(s) of the present disclosure. The camera 124 of the camera device 104, without the mirror apparatus 102, may have the first FOV 214. A vertical angle of the first FOV 214 may include, but is not limited to, 50 degrees, 89 degrees, 118 degrees, and/or any other angle. The visor 108 of the mirror apparatus 102 may obstruct at least the portion 220 of the first FOV 214 of the camera 124. For example, the vertical location of the visor 108 may cause the visor 108 to obstruct a lower portion 502 of the lens 134 of the camera 124. The lower portion 502 may include, but is not limited to, 10%, 20%, 30%, and/or any other percentage of the height of the lens 134 of the camera 124.

As such, the mirror apparatus 102 may obstruct the bottom portion 220 of the first FOV 214 of the camera 124. However, the mirror apparatus 102 may further extend the FOV of the camera 124 to include the additional FOV 222. For instance, and as illustrated in the example of FIG. 5, light 504(1)-(2) from the area 216 below and just in front of the camera device 104 may reflect off the mirror portion 326 on the back surface of the visor 108 (which is illustrated in FIG. 3D) and toward the lens 134 of the camera 124. As such, when the mirror apparatus 102 is attached to the camera device 104, the total FOV of the camera 124 may include the portion 224 of the first FOV 214 as well as the additional FOV 222 provided by the mirror apparatus 102. The mirror apparatus 102 thus makes the area 216 below and just in front of the camera device 104 visible to the camera 124. When a parcel is placed in this area, the parcel is visible to a user viewing the images from the camera 124 on the client device 212, as described above with reference to FIG. 2.

In some examples, the mirror portion 326 may include a separate component from the visor 108. For instance, the mirror portion 326 may be secured to the back surface 325 of the transverse member 132, such as by adhesive or snap-fit. The mirror portion 326 may include, but is not limited to, a mirror, reflective plastic, reflective polyester, and/or any other material that is capable of reflecting light. In other examples, the mirror portion 326 may not be a separate component from the back surface 325 of the transverse member 132. For instance, the mirror portion 326 may include a reflective polish, a reflective paint, and/or some other material that is applied to the back surface 325 of the visor 108.

FIGS. 6A-6D are views of the visor 108 of the mirror apparatus 102 of FIG. 1, according to aspect(s) of the present disclosure. In the example of FIGS. 3A-3F, the frame 106 and the visor 108 are formed integrally. Nevertheless, for clarity, the visor 108 is shown in isolation in FIGS. 6A-6D. As described above, in alternative embodiments the frame 106 and the visor 108 may be formed as separate pieces that are attached or secured to one another.

As described herein, the bottom edge 136 of the transverse member 132 may include the indentation 138. In some examples, and as illustrated in the example of FIG. 6A, the indentation 138 may be arcuate, and may extend a first distance 602 in a first direction from the vertical axis 330, and extend a second distance 604 in a second, opposite direction from the vertical axis 330. In the example of FIG. 6A, the first distance 602 is the same as the second distance 604. However, in other examples, the first distance 602 may be different than the second distance 604.

Additionally, the indentation 138 may extend a third distance 606 along the vertical axis 330. In the example of FIG. 6A, the third distance 606 is less than the first distance 602 and the second distance 604. However, in other examples, the third distance 606 may be equal to or greater than the first distance 602 and/or the second distance 604. As described herein, the dimensions of the indentation 138 may correspond to, or be proportional to, the dimensions of the input/output device(s) that the indentation 138 is configured to expose, such as the button 122 of the camera device 104.

Additionally, the upper edge 133 of the traverse member 132 may be convexly curved. For instance, the upper edge 133 may rise by a distance 608 from a first point 610 on the upper edge 133 (and/or a second point 612 on the upper edge 133) of the traverse member 132 to a center point 614 on the upper edge 133 of the traverse member 132. Additionally, the upper edge 133 of the traverse member 132 is rounded between the first point 610 and the center point 614 and between the center point 614 and the second point 612.

Figure 6B:
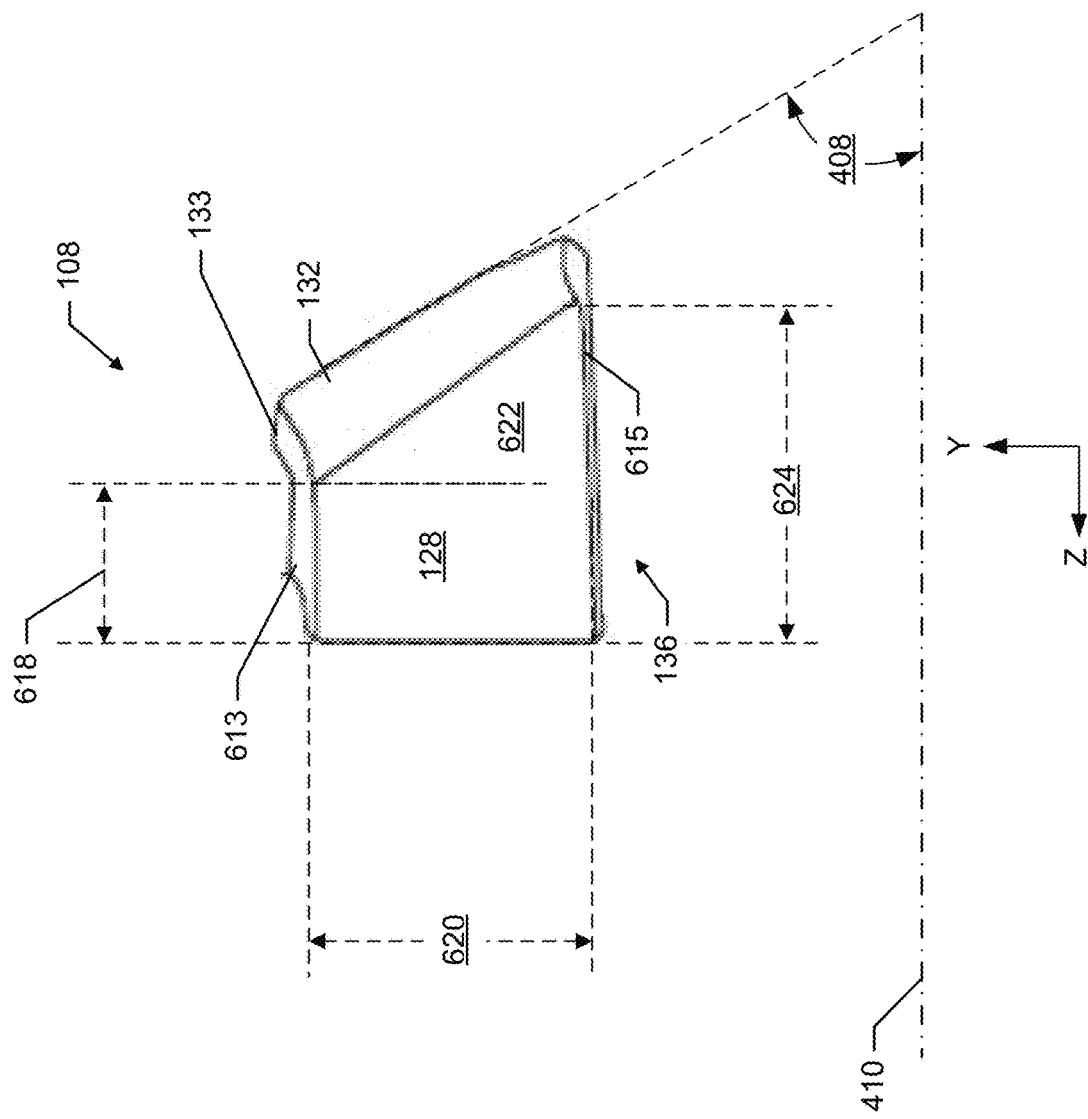
FIG. 6B is a left-side view of the visor of the mirror apparatus of FIG. 1, according to aspect(s) of the present disclosure.

As shown, the first support 128 appears generally trapezoidal from the perspective of FIG. 6B. The first support 128 includes a curvature (see FIG. 6C) in the forward portion 622 where the first support 128 meets the traverse member 132. An upper edge 613 of the first support 128 may include a first dimension (e.g., a length) 618 (e.g., 5 millimeters, 7.5 millimeters, 10 millimeters, and/or any other length). Additionally, the first support 128 may include a second dimension (e.g., a height) 620 (e.g., 10 millimeters, 15 millimeters, 20 millimeters, or any other length). A lower edge 615 of the first support 128 may include a third dimension (e.g., a length) 624 (e.g., 7.5 millimeters, 10 millimeters, 20 millimeters, or any other length). In some instances, the trapezoidal shape and the curvature of the traverse member 132 provide the oblique angle 337. While not visible in FIG. 6B, the shape of the second support 130 may be a mirror image of the first support 128.

Figure 6C:
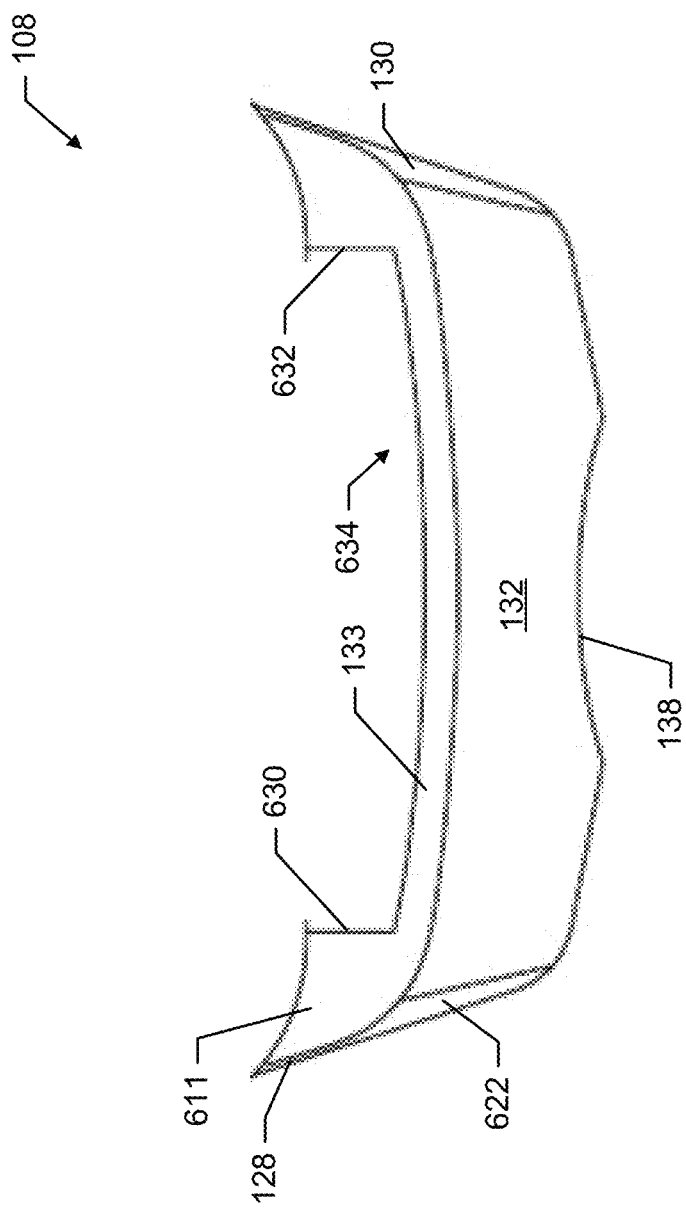
FIG. 6C is a top view of the visor of the mirror apparatus of FIG. 1, according to aspect(s) of the present disclosure.
Figure 6D:
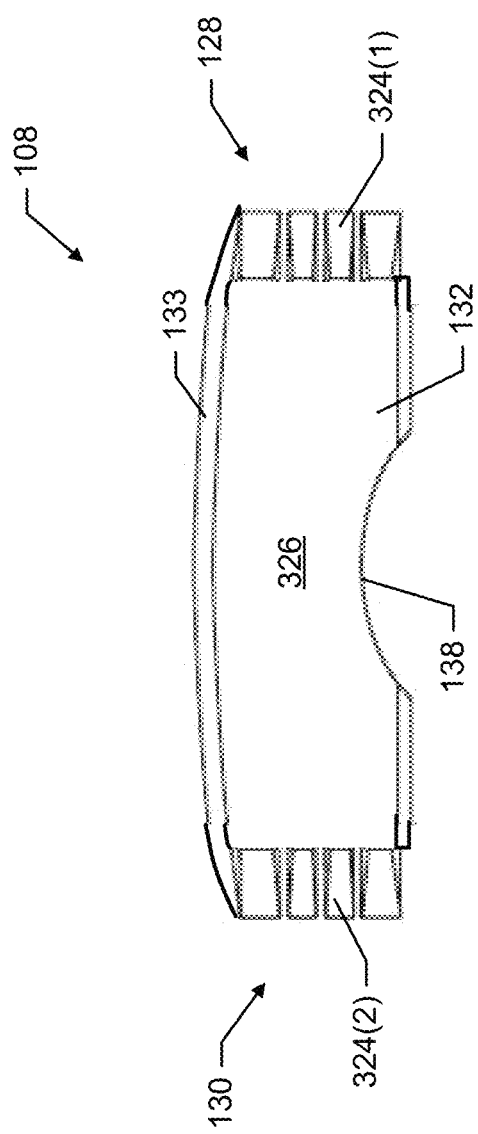
FIG. 6D is a back view of the visor of the mirror apparatus of FIG. 1, according to aspect(s) of the present disclosure.

As shown in the example of FIG. 6C, a back surface 630 of the first support 128 and a back surface 632 of the second support 130 are substantially planar. Furthermore, a back surface 634 of the transverse member 132 includes a concave curvature. However, in other examples, the back surface 630 and/or the back surface 632 may include a curved surface, a triangular surface, and/or any other shaped surface. Additionally, in other examples, the back surface 634 may include a flat surface, a triangular surface, and/or any other shaped surface.

FIGS. 7A-7B illustrate how the curvature of the upper edge 133 of the transverse member 132 of FIG. 1 corrects image distortions, according to aspect(s) of the present disclosure. As shown, the upper edge 133 of the transverse member 132 includes a curvature with a radius 702. The radius 702 may include, but is not limited to, 100 millimeters, 123.27 millimeters, 150 millimeters, and/or any other length. This curvature helps correct image distortion in images generated by the electronic device 104. For example, and as illustrated by an image 704 illustrated in the example of FIG. 7B, the curvature of the upper edge 133 of the transverse member 132 causes the curved upper edge 133 of the transverse member 132 to appear straight within the image 704.

Figure 8C:
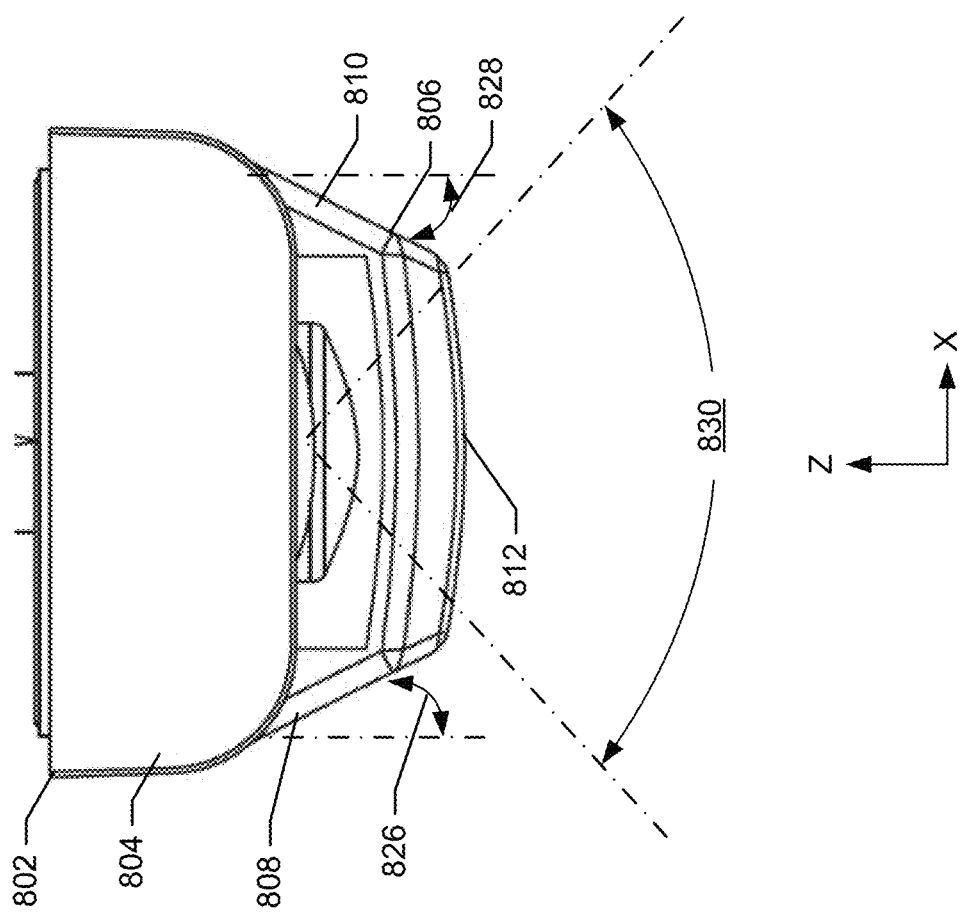
FIG. 8C is a top view of the first alternative mirror apparatus of FIG. 8A, according to various aspect(s) of the present disclosure.

FIGS. 8A-8C are various views of a first alternative mirror apparatus 802 attached to the camera device 104, according to aspect(s) of the present disclosure. The mirror apparatus 802 may include a frame 804 and a visor 806. In the example of FIGS. 8A-8C, the frame 804 may be similar to the frame 106.

In some examples, the visor 806 and the frame 804 are molded together to create a single structure. For instance, the visor 806 may include a first support 808, a second support 810, and a transverse member 812. The first support 808 of the visor 806 may extend from a first side member 814 of the frame 804 and the second support 810 of the visor 806 may extend from a second side member 816 of the frame 804. Additionally, the transverse member 812 of the visor 804 may extend between the first support 808 and the second support 810. As such, the visor 806 may extend across an opening 818 of the frame 804.

Similar to the transverse member 132 of the visor 108, the transverse member 812 of the visor 806 may be oriented at an oblique angle with respect to a plane defined by the opening 818 (e.g., a plane perpendicular to the Z-direction) and/or with respect to an axis of the lens 134 of the camera 124. A back surface of the transverse member 812 may comprise a reflective material. As such, and since the transverse member 812 of the visor 806 is located at least partly within the FOV of the camera 124, the reflective material may reflect light from the area 216 below and just in front of the camera device 104 into the lens 134 of the camera 124.

An upper edge 820 of the transverse member 812 of the visor 806 includes a convex curvature. As described in further detail below, the curvature may correct any image distortion caused by the lens 134 of the camera 124, so that the upper edge 820 appears to be straight in the images recorded by the camera 124 when viewed on the client device. However, in other examples, the upper edge 820 of the transverse member 812 may be straight, or have another type or degree of curvature.

In some instances, a bottom edge 822 of the transverse member 812 may include an indentation 824. In the illustrated embodiment, the indentation 824 has an arcuate shape. However, in other examples, the indentation 824 may have another shape, such as octagonal, hexagonal, rectangular, triangular, or any other shape. In some instances, the transverse member 812 of the visor 806 includes the indentation 824 so that the transverse member 812 does not obstruct the visibility of one or more input/output devices of the camera device 104. For example, because the transverse member 812 includes the arcuate indentation 824, the transverse member 812 does not obstruct the visibility of the button 122 of the camera device 104.

As shown in the example of FIG. 8C, the first support 808 may extend from the frame 804 at an angle 826 and the second support 810 may extend from the frame 804 at an angle 828. The angle 826 and/or the angle 828 may each include, but are not limited to, 20 degrees, 30 degrees, 40 degrees, and/or any other angle. This may be different than the first support 128 and/or the second support 130 of the visor 108, which are described herein. Based at least in part on the angle 826 and/or the angle 828, a horizontal FOV 830 of the camera device 104 when using the mirror apparatus 802 may be less than the horizontal FOV of the camera device 104 when using the mirror apparatus 102. The horizontal FOV 830 may include, but is not limited to, 100 degrees, 105 degrees, 110 degrees, and/or any other angle.

Figure 9B:
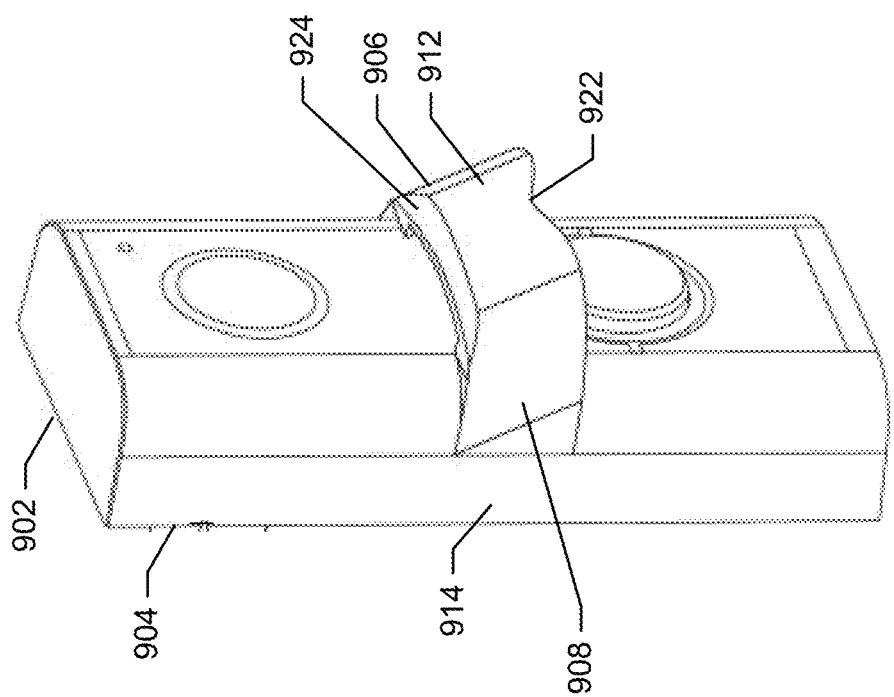
FIG. 9B is a front perspective view of the second alternative mirror apparatus of FIG. 9A, according to various aspect(s) of the present disclosure.
Figure 9A:
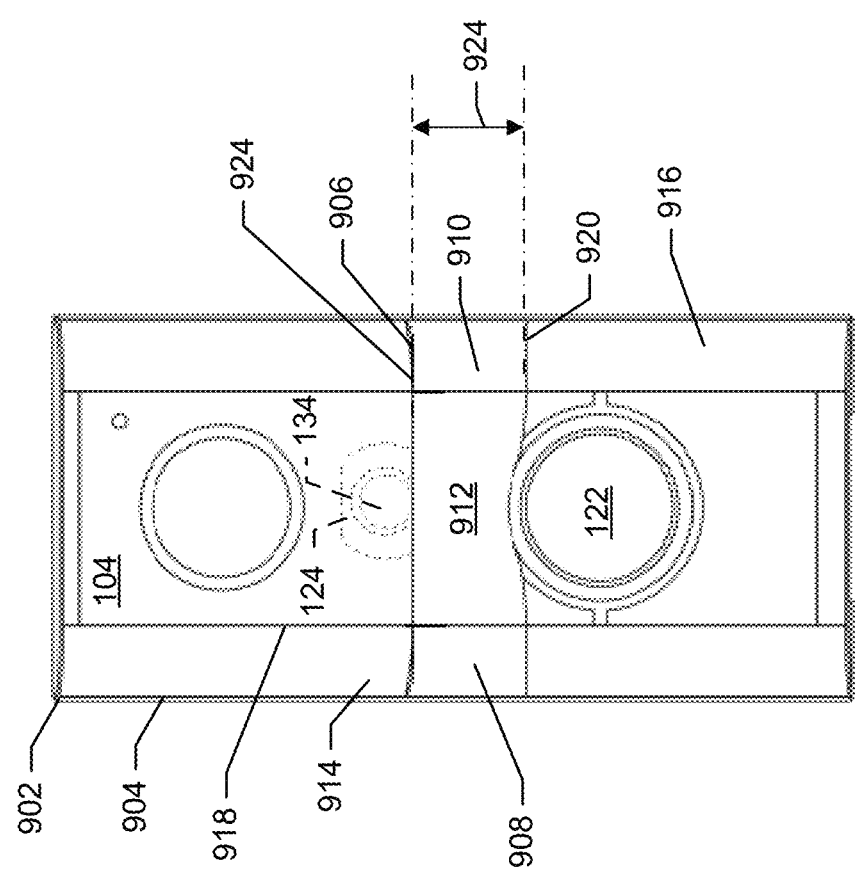
FIG. 9A is a front view of a second alternative mirror apparatus, according to aspect(s) of the present disclosure.
Figure 9C:
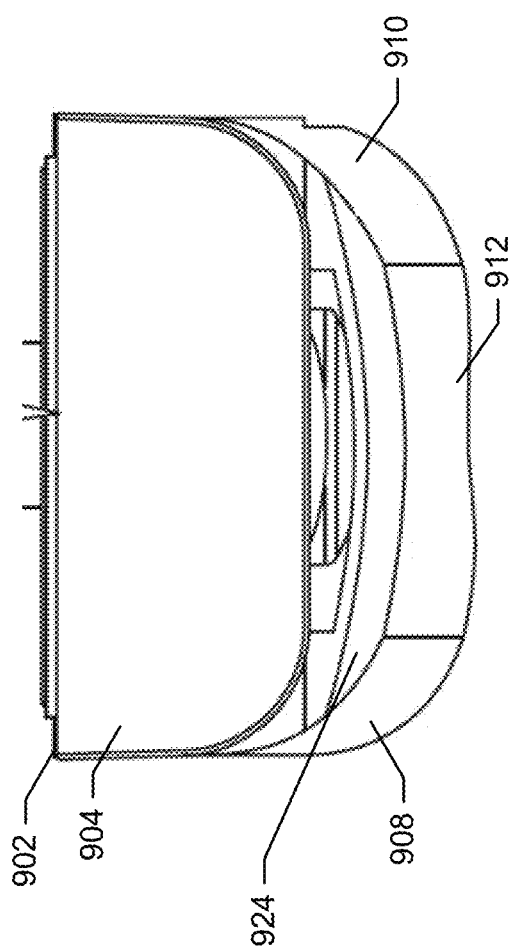
FIG. 9C is a top view of the second alternative mirror apparatus of FIG. 9A, according to various aspect(s) of the present disclosure.

FIGS. 9A-9C are various views of a second alternative mirror apparatus 902 attached to the camera device 104, according to aspect(s) of the present disclosure. The mirror apparatus 902 may include a frame 904 and a visor 906. In the example of FIGS. 9A-9C, the frame 904 may be similar to the frame 106.

In some examples, the visor 906 and the frame 904 are molded together to create a single structure. For instance, the visor 906 may include a first support 908, a second support 910, and a transverse member 912. The first support 908 of the visor 906 may extend from a first side member 914 of the frame 904 and the second support 910 of the visor 906 may extend from a second side member 916 of the frame 904. Additionally, the transverse member 912 of the visor 904 may extend between the first support 908 and the second support 910. As such, the visor 906 may extend across an opening 918 of the frame 904.

Similar to the transverse member 132 of the visor 108, the transverse member 912 of the visor 906 may be oriented at an oblique angle with respect to a plane defined by the opening 918 (e.g., a plane perpendicular to the Z-direction) and/or with respect to an axis of the lens 134 of the camera 124. A back surface of the transverse member 912 may comprise a reflective material. As such, and since the transverse member 912 of the visor 906 is located at least partly within the FOV of the camera 124, the reflective material may reflect light from the area 216 below and just in front of the camera device 104 into the lens 134 of the camera 124.

In some instances, a bottom edge 920 of the transverse member 912 may include an indentation 922. In the illustrated embodiment, the indentation 922 has an arcuate shape. However, in other examples, the indentation 922 may have another shape, such as octagonal, hexagonal, rectangular, triangular, or any other shape. In some instances, the transverse member 912 of the visor 906 includes the indentation 922 so that the transverse member 912 does not obstruct the visibility of one or more input/output devices of the camera device 104. For example, because the transverse member 912 includes the arcuate indentation 922, the transverse member 912 does not obstruct the visibility of the button 122 of the camera device 104.

As shown, an upper edge 924 of the transverse member 912 may be substantially flat. As such, and as will be shown in the example of FIG. 10C, images captured by the camera device 104 may include greater distortion when using the mirror apparatus 902 than when using the mirror apparatus 102. Additionally, a dimension 926 (e.g., height) of the visor 906 may be greater than the dimensions (e.g., the dimension 620) the visor 108. This may cause a horizontal FOV of the camera device 104 when using the mirror apparatus 902 may be greater than the horizontal FOV of the camera device 104 when using the mirror apparatus 102. The horizontal FOV may include, but is not limited to, 120 degrees, 130 degrees, 145 degrees, and/or any other angle.

Figure 10A:
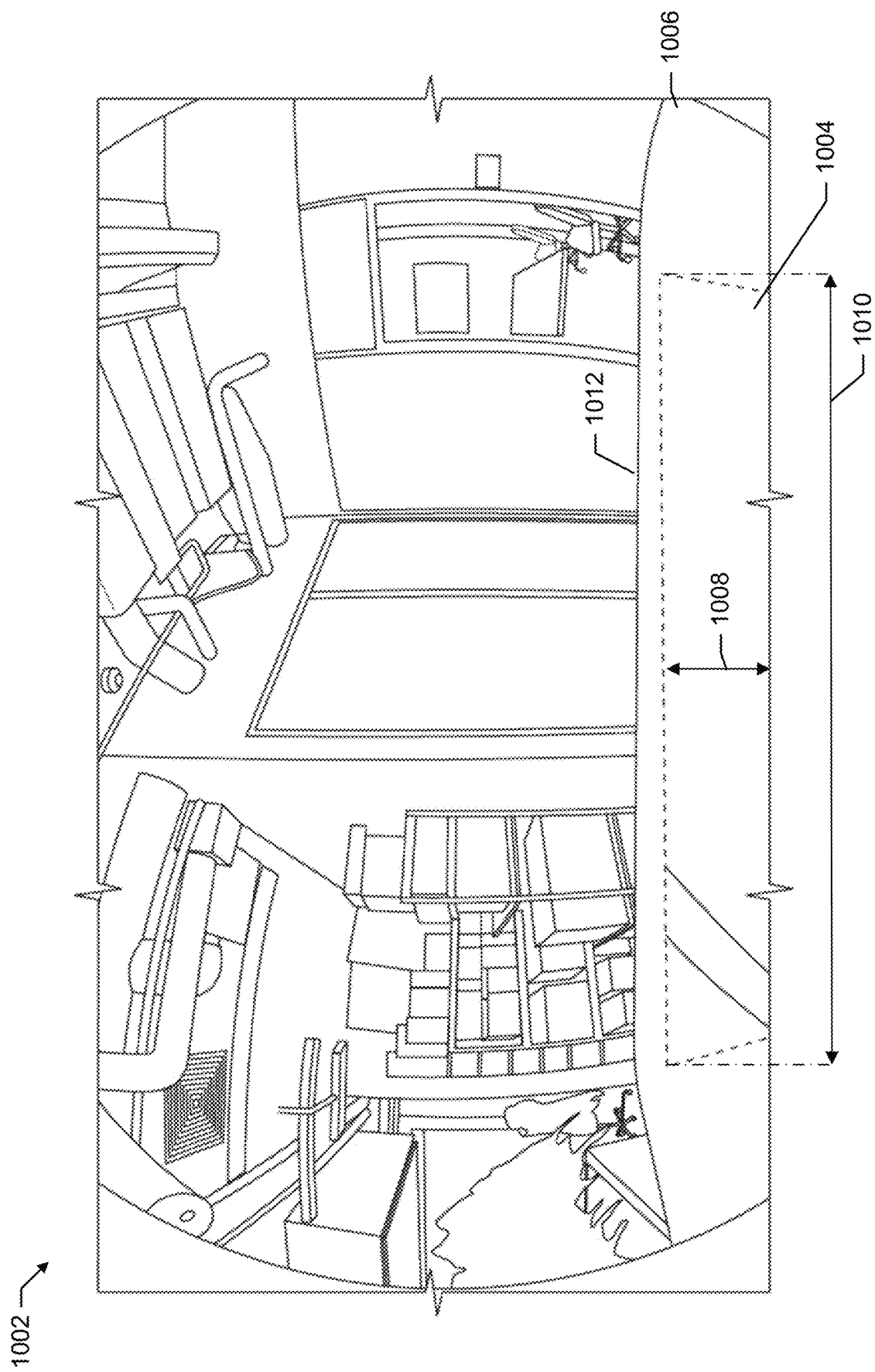
FIG. 10A is an image captured by a camera device using the mirror apparatus of FIG. 1, according to aspect(s) of the present disclose.

FIG. 10A illustrates an image 1002 captured by the camera device 104 when using the mirror apparatus 102 of FIG. 1, according to aspect(s) of the present disclose. As shown, a portion 1004 of the image 1002 includes the area 214 below and just in front of the camera device 104, which is captured using the mirror apparatus 102. The image 1002 also depicts the visor 108 of the mirror apparatus 102, which is indicated by 1006. The portion 1004 of the image 1002 may include a first dimension 1008 (e.g., a vertical dimension) and a second dimension 1010 (e.g., horizontal dimension). The first dimension 1008 may include, but is not limited to, 40 centimeters, 41 centimeters, 50 centimeters, and/or any other distance. Additionally, the second dimension 1010 may include, but is not limited to, 230 centimeters, 250 centimeters, 270 centimeters, and/or any other distance.

In the example of FIG. 10A, and as described herein, the upper edge 133 of the visor 108 is depicted as including a substantially straight line 1012. This is because of the curvature of the upper edge 133 of the visor 108.

Figure 10B:
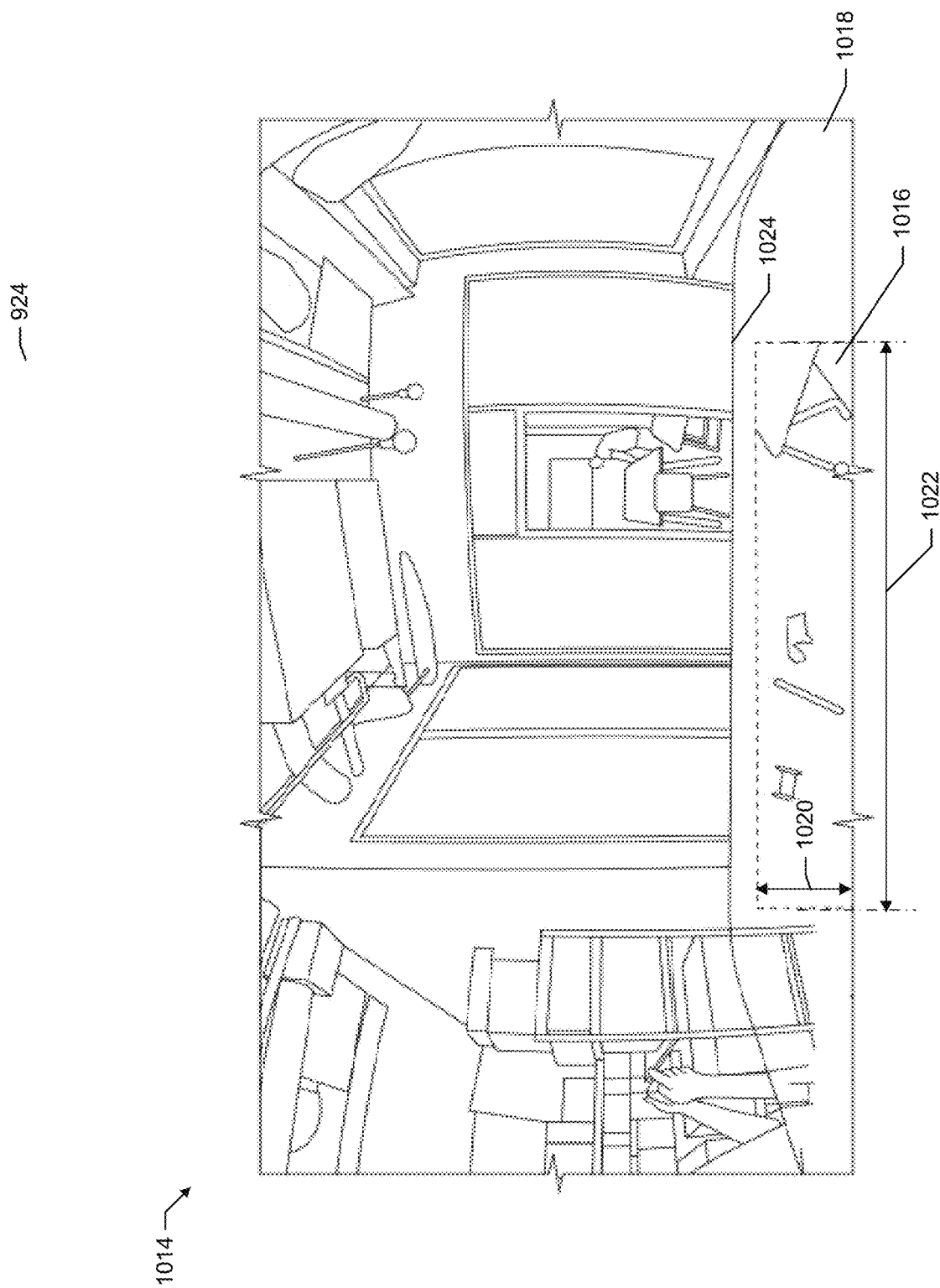
FIG. 10B is an image captured by a camera device using the first alternative mirror apparatus of FIGS. 8A-8C, according to aspect(s) of the present disclose.

FIG. 10B illustrates an image 1014 captured by the camera device 104 when using the mirror apparatus 802 of FIGS. 8A-8C, according to aspect(s) of the present disclose. As shown, a portion 1016 of the image 1014 includes the area 214 below and just in front of the camera device 104, which is captured using the mirror apparatus 802. The image 1014 also depicts the visor 806 of the mirror apparatus 802, which is indicated by 1018. The portion 1016 of the image 1014 may include a first dimension 1020 (e.g., a vertical dimension) and a second dimension 1022 (e.g., horizontal dimension). The first dimension 1020 may include, but is not limited to, 40 centimeters, 45 centimeters, 50 centimeters, and/or any other distance. Additionally, the second dimension 1022 may include, but is not limited to, 180 centimeters, 185 centimeters, 190 centimeters, and/or any other distance. In some instances, the first dimension 1008 caused by the mirror apparatus 102 is greater than the first dimension 1020 caused by the mirror apparatus 802. In some instances, the second dimension 1010 cause by the mirror apparatus 102 is greater than the second dimension 1022 caused by the mirror apparatus 802.

In the example of FIG. 10B, and as described herein, the upper edge 820 of the visor 806 is depicted as including a substantially straight line 1024. This is because of the curvature of the upper edge 820 of the visor 806.

Figure 10C:
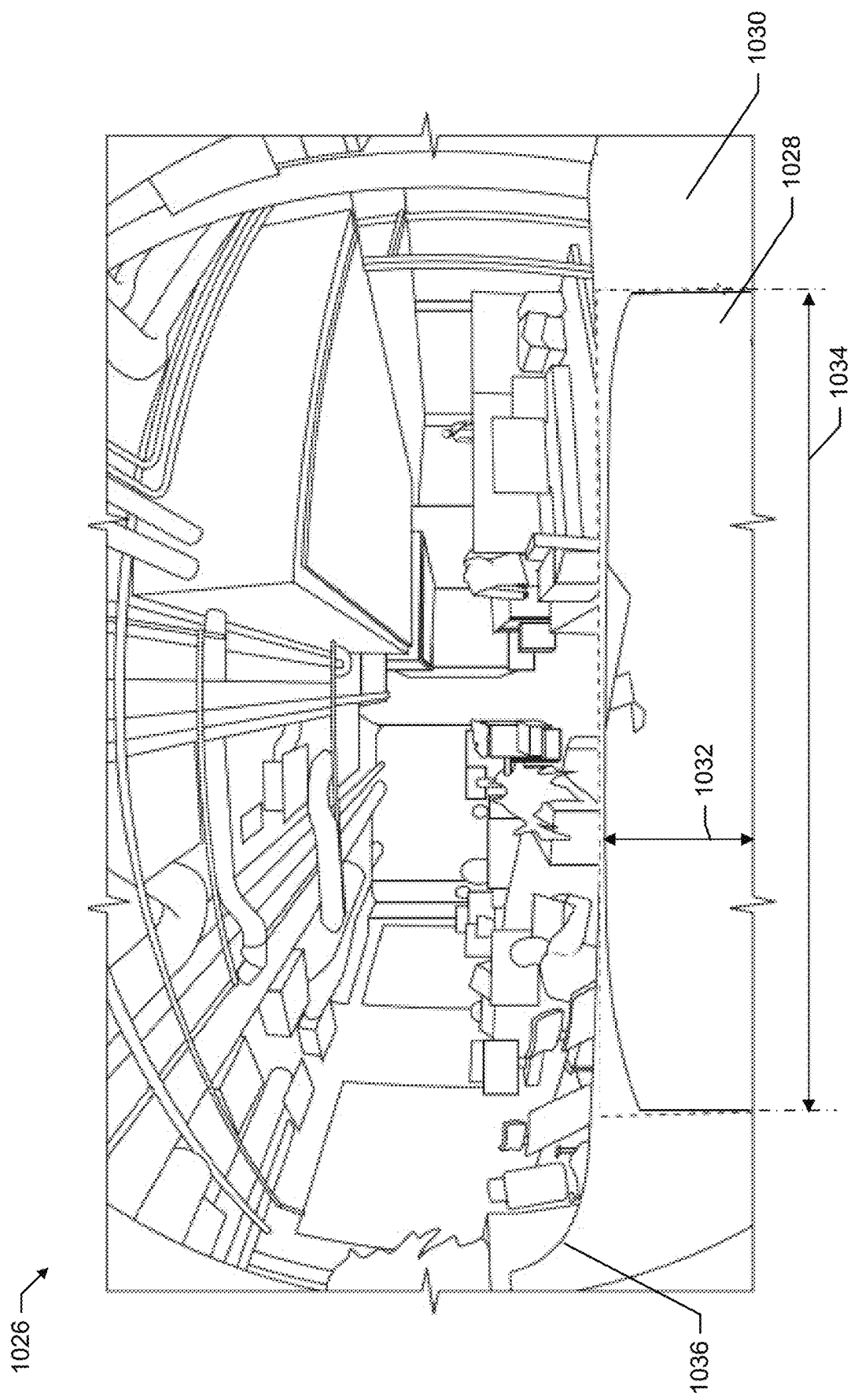
FIG. 10C is an image captured by a camera device using the second alternative mirror apparatus of FIGS. 9A-9C, according to aspect(s) of the present disclose.

FIG. 10C illustrates an image 1026 captured by the camera device 104 when using the mirror apparatus 902 of FIGS. 9A-9C, according to aspect(s) of the present disclose. As shown, a portion 1028 of the image 1026 includes the area 214 below and just in front of the camera device 104, which is captured using the mirror apparatus 902. The image 1026 also depicts the visor 906 of the mirror apparatus 902, which is indicated by 1030. The portion 1028 of the image 1026 may include a first dimension 1032 (e.g., a vertical dimension) and a second dimension 1034 (e.g., horizontal dimension). The first dimension 1032 may include, but is not limited to, 50 centimeters, 53 centimeters, 60 centimeters, and/or any other distance. Additionally, the second dimension 1034 may include, but is not limited to, 240 centimeters, 251 centimeters, 260 centimeters, and/or any other distance. In some instances, the first dimension 1008 caused by the mirror apparatus 102 is less than the first dimension 1032 caused by the mirror apparatus 902. In some instances, the second dimension 1010 cause by the mirror apparatus 102 is less than the second dimension 1034 caused by the mirror apparatus 902.

In the example of FIG. 10C, and as described herein, the upper edge 920 of the visor 906 is depicted as not including straight line 1024. This may be because, unlike the upper edge 133 of the visor 108 and the upper edge 820 of the visor 806, the upper edge 920 of the visor 906 is substantially flat. As such, the light reflecting off of the visor 906 and towards the camera device 104 may cause the distortion in the image 1026.

FIG. 11 illustrates example fields of view of the camera device 102 when using a mirror apparatus, such as the mirror apparatus 102, according to aspect(s) of the present disclosure. As shown, the camera apparatus may be located at a location 1102 above a structure 1104, such as a door, wall, garage, and/or any other type of structure. In the example of FIG. 11, the location 1102 is a distance 1106 above a floor 1108. The distance 1106 may include, but is not limited to, 120 centimeters, 150 centimeters, 180 centimeters, and/or any other distance.

The camera device 104 may originally have a vertical FOV that is represented by an angle 1110 (which may be similar to the FOV 214). The angle 1110 may include, but is not limited to, 80 degrees, 89 degrees, 111 degrees, and/or any other angle. As such, the vertical FOV of the camera device 104 may include an area of the floor 1108 that is further away from a first distance 112 from the structure 1104. The first distance 1112 may include, but is not limited to, 150 centimeters, 160 centimeters, 180 centimeters, and/or any other distance. Additionally, and as illustrated in the example of FIG. 11, the vertical FOV of the camera device 104 may originally not include an area that is represented by an angle 1114. The angle 1114 may include, but is not limited to, 30 degrees, 46 degrees, 50 degrees, and/or any other angle. As such, the vertical FOV of the camera device 104 may not include an area of the floor 1108 that is between the structure 1104 and the first distance 1112.

After placing the mirror apparatus 102 on the camera device 104, the vertical FOV of the camera device 104 may be altered. For instance, and as shown, the mirror apparatus 102 may block a portion of the vertical FOV that is represented by an angle 1116. The angle 1116 may include, but is not limited to, 20 degrees, 25 degrees, 30 degrees, and/or any other angle. As such, the vertical FOV of the camera device 104 may no longer include an area of the floor 1108 that is between the first distance 1112 and a second distance 1118. The second distance 1118 may include, but is not limited to, 300 centimeters, 330 centimeters, 360 centimeters, and/or any other distance.

However, the vertical FOV of the camera device 104 may include a new area that is represented by an angle 1120. The angle 1120 may include, but is not limited to, 20 degrees, 25 degrees, 30 degrees, and/or the like. As such, the vertical FOV of the camera device 104 may include a new area of the floor 1108 that is between a third distance 1122 from the structure 1104 and a fourth distance 1124 from the structure 1104. The third distance 1104 may include, but is not limited to, 5 centimeters, 10 centimeters, 15 centimeters, and/or any other distance. Additionally, the fourth distance 1124 may include, but is not limited to, 40 centimeters, 50 centimeters, 60 centimeters, and/or the like.

FIGS. 12A-12C are front and left-side views of another example apparatus 1202 attached to the camera device 104, according to aspect(s) of the present disclosure. As shown, the apparatus 1202 includes a frame 1204 and a reflective prism 1206. In some instances, the frame 1204 may be similar to the frame 106 of the mirror apparatus 102. The reflective prism 1206 may comprise glass, plastic, fluorite, or another material.

As shown in FIG. 12C, the reflective prism 1206 comprises a transparent optical element with a triangular shape as viewed from the side view, and including a flat, polished surface 1207 that reflects light rays into the camera 134. For example, the reflective prism 1206 may extend the FOV 214 of the camera device 104 to include an additional FOV 1208 that includes the area below and just in front of the camera device 104.

Figure 13B:
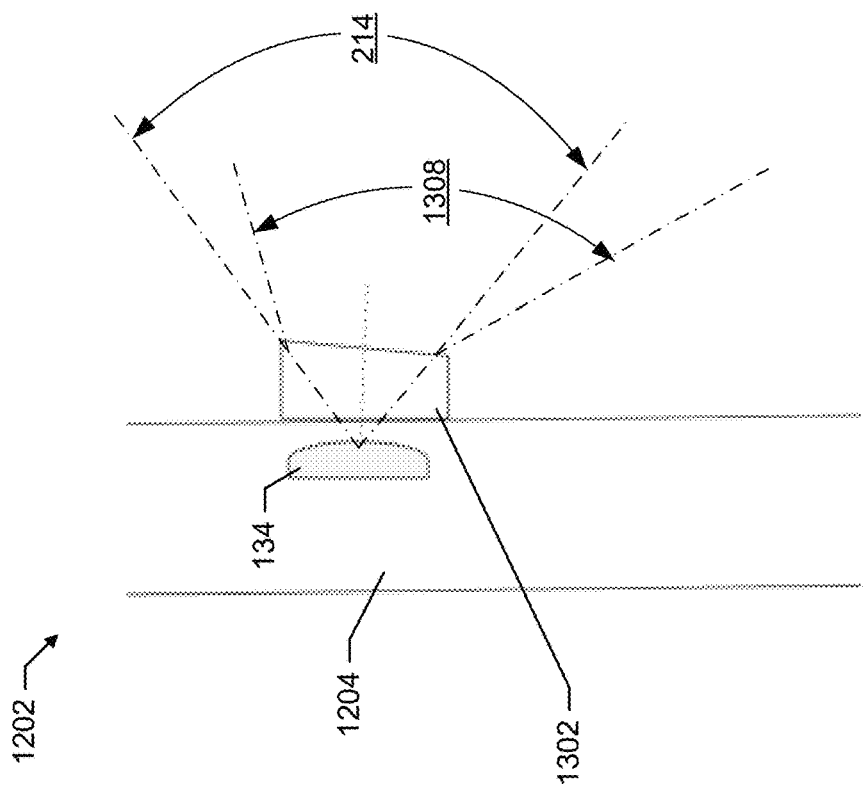
FIG. 13B is a left-side view of an apparatus including a refractive prism, and illustrating an example of a second location for placing the refractive prism, according to aspect(s) of the present disclosure.
Figure 13A:
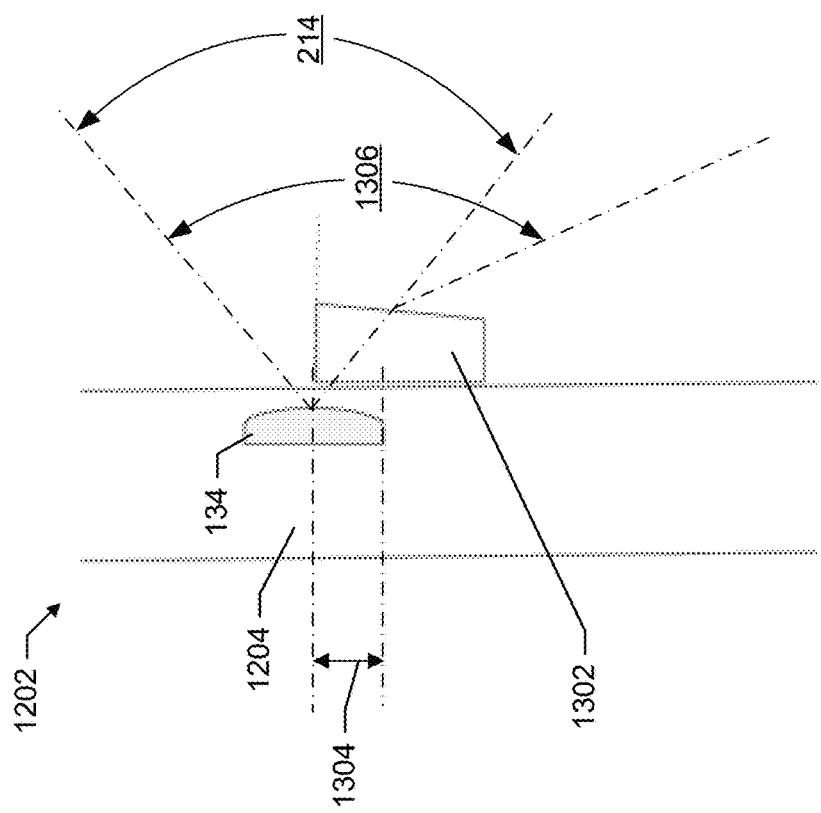
FIG. 13A is a left-side view of an apparatus including a refractive prism, and illustrating an example of a first location for placing the refractive prism, according to aspect(s) of the present disclosure.

FIGS. 13A and 13B illustrate a refractive prism 1302, including an example of a first location (FIG. 13A) and an example of a second location (FIG. 13B) for placing the refractive prism 1302, according to aspect(s) of the present disclosure. For instance, and as shown, the refractive prism 1302 may be located at least partly in front of the lens 134 of the camera device 104. In the example of FIG. 13A, the refractive prism 1302 is at a location that covers a bottom portion 1304 of the lens 134. In some instances, the bottom portion 1304 may include the bottom half of the lens 134. In other instances, the bottom portion 1304 may include any other portion of the lens 134. By placing the refractive prism 1302 at the location of FIG. 13A, a refracted FOV 1306 is created by the refractive prism 1302. As shown, the refracted FOV 1306 is larger than the original FOV 214 of the camera device 104.

FIG. 13B is an example of a second location for placing the refractive prism 1302, according to aspect(s) of the present disclosure. In the example of FIG. 13B, the refractive prism 1302 is now located completely in front of the lens 134 of the camera device 104. By placing the refractive prism 1302 at the location of FIG. 13B, a refracted FOV 1308 is created by the refractive prism 1302. As shown, the refracted FOV 1302 is different than the original FOV 214. In some instances, the refracted FOV 1308 is equal to or greater than the original FOV 214. In other instances, the refracted FOV 1308 is less than the original FOV 214.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

EXAMPLE CLAUSES

In a first aspect, a faceplate for a video doorbell, the faceplate comprising: a frame configured to attach to the video doorbell, the frame including a first side member, a second side member, a top member, and a bottom member, wherein the first side member, the second side member, the top member, and the bottom member define edges of an opening that receives a front portion of the video doorbell when the faceplate is attached to the video doorbell; and a visor comprising: a first support extending forward from the first side member; a second support extending forward from the second side member; a transverse member extending between the first support and the second support across the opening in the frame, the transverse member being located at least partly within a field-of-view (FOV) of a camera of the video doorbell when the faceplate is attached to the video doorbell; and a mirror on a back surface of the transverse member, the mirror being oriented at an oblique angle with respect to an axis of a lens of the camera when the faceplate is attached to the video doorbell.

In an embodiment of the first aspect, wherein the transverse member includes a bottom edge having an arcuate indentation that enhances the visibility of a button of the video doorbell when the faceplate is attached to the video doorbell.

In another embodiment of the first aspect wherein the mirror includes a concave curvature.

In a second aspect, an apparatus comprising: a frame defining a front opening, a first side member, and a second side member; a first support extending forward from the first side member; a second support extending forward from the second side member; and a transverse member extending between the first support and the second support, the transverse member including a mirror portion having a reflective surface, the reflective surface being oriented at an oblique angle relative to a plane defined by the front opening of the frame.

In an embodiment of the second aspect, wherein: the frame further defines a rear opening; the first side member includes a first curved portion adjacent the front opening and a first planar portion adjacent the rear opening; and the second side member includes a second curved portion adjacent the front opening and a second planar portion adjacent the rear opening.

In another embodiment of the second aspect, wherein the frame further defines a top member extending between the first side member and the second side member, and a bottom member extending between the first side member and the second side member.

In another embodiment of the second aspect, wherein the top member is substantially planar, and wherein the bottom member is substantially planar.

In another embodiment of the second aspect, wherein the reflective surface includes a concave curvature.

In another embodiment of the second aspect, wherein the mirror portion further includes a bottom edge having an arcuate indentation.

In another embodiment of the second aspect, wherein the mirror portion further includes a top edge, at least a portion of the top edge being arcuate.

In another embodiment of the second aspect, wherein: the first support appears generally trapezoidal when viewed from a first side of the apparatus; and the second support appears generally trapezoidal when viewed from a second side of the apparatus.

In another embodiment of the second aspect, wherein a portion of the reflective surface includes a curve, the portion of the reflective surface being located proximate to an edge of the traverse member.

In another embodiment of the second aspect, wherein the curve of the reflective surface causes image data generated by an electronic device that includes the apparatus to represent the edge of the traverse member as substantially straight.

In a third aspect, an apparatus comprising: a frame defining a front opening, a first side member, and a second side member; and a transverse member extending across the front opening, the transverse member including a mirror portion having a reflective surface, the reflective surface including a concave curvature.

In an embodiment of the third aspect, wherein the reflective surface is oriented at an oblique angle relative to a plane defined by the front opening of the frame.

In another embodiment of the third aspect, further comprising: a first support extending from the first side member; and a second support extending from the second side member, wherein the transverse member extends between the first support and the second support.

In another embodiment of the third aspect, wherein: the frame further defines a rear opening; the first side member includes a first curved portion adjacent the front opening and a first planar portion adjacent the rear opening; and the second side member includes a second curved portion adjacent the front opening and a second planar portion adjacent the rear opening.

In another embodiment of the third aspect, wherein the frame further comprises: a substantially planar top member; and a substantially planar bottom member.

In another embodiment of the third aspect, wherein the mirror portion further comprises a bottom edge having an arcuate indentation.

In another embodiment of the third aspect, wherein the mirror portion further includes a top edge, at least a portion of the top edge being arcuate.

What is claimed is:

1. A faceplate for a video doorbell, the faceplate comprising:
    a frame configured to attach to the video doorbell, the frame including a first side member, a second side member, a top member, and a bottom member, wherein the first side member, the second side member, the top member, and the bottom member define edges of an opening that receives a front portion of the video doorbell when the faceplate is attached to the video doorbell; and
    a visor comprising:
        a first support extending forward from the first side member;
        a second support extending forward from the second side member;
        a transverse member extending between the first support and the second support across the opening in the frame, the transverse member being located at least partly within a field-of-view (FOV) of a camera of the video doorbell when the faceplate is attached to the video doorbell; and
        a mirror on a back surface of the transverse member, the mirror being oriented at an oblique angle with respect to an axis of a lens of the camera when the faceplate is attached to the video doorbell.

2. The faceplate as recited in claim 1, wherein the transverse member includes a bottom edge having an arcuate indentation that enhances the visibility of a button of the video doorbell when the faceplate is attached to the video doorbell.

3. The faceplate as recited in claim 1, wherein the mirror includes a concave curvature.

4. An apparatus comprising:
    a frame defining a front opening, a first side member, and a second side member;
    a first support extending forward from the first side member;
    a second support extending forward from the second side member; and
    a transverse member extending between the first support and the second support, the transverse member including a mirror portion having a reflective surface that includes a curve, the reflective surface being oriented at an oblique angle relative to a plane defined by the front opening of the frame and located proximate to an edge of the transverse member.

5. The apparatus as recited in claim 4, wherein:
    the frame further defines a rear opening;
    the first side member includes a first curved portion adjacent the front opening and a first planar portion adjacent the rear opening; and
    the second side member includes a second curved portion adjacent the front opening and a second planar portion adjacent the rear opening.

6. The apparatus as recited in claim 4, wherein the frame further defines a top member extending between the first side member and the second side member, and a bottom member extending between the first side member and the second side member.

7. The apparatus as recited in claim 6, wherein the top member is substantially planar, and wherein the bottom member is substantially planar.

8. The apparatus as recited in claim 4, wherein the reflective surface includes a concave curvature.

9. The apparatus as recited in claim 4, wherein the mirror portion further includes a bottom edge having an arcuate indentation.

10. The apparatus as recited in claim 4, wherein the mirror portion further includes a top edge, at least a portion of the top edge being arcuate.

11. The apparatus as recited in claim 4, wherein:
    the first support appears generally trapezoidal when viewed from a first side of the apparatus; and
    the second support appears generally trapezoidal when viewed from a second side of the apparatus.

12. The apparatus as recited in claim 9, further comprising:
    a first support extending from the first side member; and
    a second support extending from the second side member, wherein the transverse member extends between the first support and the second support.

13. The apparatus as recited in claim 4, wherein the curve of the reflective surface causes image data generated by an electronic device that includes the apparatus to represent the edge of the traverse member as substantially straight.

14. An apparatus comprising:
    a frame defining a front opening, a first side member, and a second side member; and a transverse member extending across the front opening, the transverse member including a mirror portion having a reflective surface, the reflective surface including a concave curvature, wherein the mirror portion comprises a top edge having an arcuate portion.

15. The apparatus as recited in claim 14, wherein the reflective surface is oriented at an oblique angle relative to a plane defined by the front opening of the frame.

16. The apparatus as recited in claim 14, further comprising:
a first support extending from the first side member; and
a second support extending from the second side member, wherein the transverse member extends between the first support and the second support.

17. The apparatus as recited in claim 14, wherein:
the frame further defines a rear opening;
the first side member includes a first curved portion adjacent the front opening and a first planar portion adjacent the rear opening; and
the second side member includes a second curved portion adjacent the front opening and a second planar portion adjacent the rear opening.

18. The apparatus as recited in claim 14, wherein the frame further comprises:
a substantially planar top member; and
a substantially planar bottom member.

19. An apparatus comprising:
a frame defining a front opening, a first side member, and a second side member; and
a transverse member extending across the front opening, the transverse member including a mirror portion having a reflective surface, the reflective surface including a concave curvature;
wherein the mirror portion comprises a bottom edge having an arcuate indentation.

20. The apparatus as recited in claim 19, wherein the reflective surface is oriented at an oblique angle relative to a plane defined by the front opening of the frame.

\* \* \* \* \*